US012560434B2

(12) United States Patent
Kawauchi et al.

(10) Patent No.: US 12,560,434 B2
(45) Date of Patent: Feb. 24, 2026

(54) ACCELERATION MONITORING DEVICE, ACCELERATION MONITORING METHOD, AND PROGRAM

(71) Applicant: MITSUBISHI HEAVY INDUSTRIES, LTD., Tokyo (JP)

(72) Inventors: Akihisa Kawauchi, Tokyo (JP); Koji Uchida, Tokyo (JP); Kosaku Murase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 481 days.

(21) Appl. No.: 18/020,318

(22) PCT Filed: Dec. 1, 2021

(86) PCT No.: PCT/JP2021/044022
§ 371 (c)(1),
(2) Date: Feb. 8, 2023

(87) PCT Pub. No.: WO2022/176314
PCT Pub. Date: Aug. 25, 2022

(65) Prior Publication Data
US 2023/0324177 A1 Oct. 12, 2023

(30) Foreign Application Priority Data

Feb. 19, 2021 (JP) ................................. 2021-024875

(51) Int. Cl.
*G01C 21/16* (2006.01)
*B61F 5/50* (2006.01)
*B61L 25/02* (2006.01)
(52) U.S. Cl.
CPC ................ *G01C 21/16* (2013.01); *B61F 5/50* (2013.01); *B61L 25/021* (2013.01)

(58) Field of Classification Search
None
See application file for complete search history.

(56) References Cited

U.S. PATENT DOCUMENTS

| | | | | |
|---|---|---|---|---|
| 2009/0040390 A1* | 2/2009 | Morita | ................... | H04N 19/87 |
| | | | | 375/E7.076 |
| 2019/0126959 A1* | 5/2019 | Kawauchi | ............. | B61L 25/025 |
| 2020/0108849 A1* | 4/2020 | Mitsue | .................. | B61L 25/025 |

FOREIGN PATENT DOCUMENTS

| | | |
|---|---|---|
| EP | 3751249 A1 | 12/2020 |
| JP | 2007015483 A | 1/2007 |

(Continued)

OTHER PUBLICATIONS

International Search Report and Written Opinion of International Application No. PCT/JP2021/044022 mailed Jan. 18, 2022; 11pp.

*Primary Examiner* — Lisa M Caputo
*Assistant Examiner* — Cynthia L Davis
(74) *Attorney, Agent, or Firm* — HAUPTMAN HAM, LLP

(57) ABSTRACT

An acceleration monitoring device that comprises: an acquisition unit that acquires measured acceleration waveforms, being acceleration waveforms measured by a vehicle that is traveling a trajectory; a storage unit that stores a reference acceleration waveform, being an acceleration waveform that serves as a reference for measured acceleration waveforms for a predetermined area of interest that is part of the trajectory; and a monitoring unit that monitors the acceleration values for non-linear expanded/contracted and measured acceleration waveforms, being acceleration waveforms made to correspond to the reference acceleration waveform by non-linearly expanding and contracting the time axis for measured acceleration waveforms.

16 Claims, 17 Drawing Sheets

(56) References Cited

FOREIGN PATENT DOCUMENTS

| | | | |
|----|------------|----|--------|
| JP | 2008128939 | A  | 6/2008 |
| JP | 2020019333 | A  | 2/2020 |
| JP | 2020023024 | A  | 2/2020 |
| JP | 6657162    | B2 | 3/2020 |
| JP | 2020146478 | A  | 9/2020 |
| WO | 2019003436 | A1 | 1/2019 |
| WO | 2019155627 | A1 | 8/2019 |

* cited by examiner

| REGION OF INTEREST IDENTIFICATION CODE | VEHICLE IDENTIFICATION CODE | SECTION IDENTIFICATION CODE | RUNNING LANE IDENTIFICATION CODE | ACCELERATION SENSOR IDENTIFICATION CODE | MEASUREMENT POSITION | MEASUREMENT DIRECTION | REFERENCE ACCELERATION WAVEFORM FILE NAME |
|---|---|---|---|---|---|---|---|
| RI1 | CA001 | SEC1 | DL1 | SEN1 | BELOW SPRING | UP-DOWN | FB001 |
| RI1 | CA001 | SEC1 | DL1 | SEN1 | BELOW SPRING | FRONT-REAR | FB002 |
| RI1 | CA001 | SEC1 | DL1 | SEN1 | BELOW SPRING | LEFT-RIGHT | FB003 |
| RI1 | CA001 | SEC1 | DL1 | SEN2 | ABOVE SPRING | UP-DOWN | FB004 |
| RI1 | CA001 | SEC1 | DL1 | SEN2 | ABOVE SPRING | FRONT-REAR | FB005 |
| RI1 | CA001 | SEC1 | DL1 | SEN2 | ABOVE SPRING | LEFT-RIGHT | FB006 |
| ... | ... | ... | ... | ... | ... | ... | ... |
| RI1 | CA001 | SEC1 | DL2 | SEN1 | BELOW SPRING | UP-DOWN | FB101 |
| RI1 | CA001 | SEC1 | DL2 | SEN1 | BELOW SPRING | FRONT-REAR | FB102 |
| RI1 | CA001 | SEC1 | DL2 | SEN1 | BELOW SPRING | LEFT-RIGHT | FB103 |
| ... | ... | ... | ... | ... | ... | ... | ... |
| RI2 | CA001 | SEC1 | DL1 | SEN1 | BELOW SPRING | UP-DOWN | FB201 |
| RI2 | CA001 | SEC1 | DL1 | SEN1 | BELOW SPRING | FRONT-REAR | FB202 |
| RI2 | CA001 | SEC1 | DL1 | SEN1 | BELOW SPRING | LEFT-RIGHT | FB203 |
| ... | ... | ... | ... | ... | ... | ... | ... |

| MEASUREMENT DATE AND TIME | VEHICLE IDENTIFICATION CODE | SECTION IDENTIFICATION CODE | ACCELERATION SENSOR IDENTIFICATION CODE | MEASUREMENT POSITION | MEASUREMENT DIRECTION | MEASUREMENT ACCELERATION WAVEFORM FILE NAME |
|---|---|---|---|---|---|---|
| DT1 | CA101 | SEC1 | SEN1 | BELOW SPRING | UP-DOWN | FM001 |
| DT1 | CA101 | SEC1 | SEN1 | BELOW SPRING | FRONT-REAR | FM002 |
| DT1 | CA101 | SEC1 | SEN1 | BELOW SPRING | LEFT-RIGHT | FM003 |
| DT1 | CA101 | SEC1 | SEN2 | ABOVE SPRING | UP-DOWN | FM004 |
| DT1 | CA101 | SEC1 | SEN2 | ABOVE SPRING | FRONT-REAR | FM005 |
| DT1 | CA101 | SEC1 | SEN2 | ABOVE SPRING | LEFT-RIGHT | FM006 |
| ⋮ | ⋮ | ⋮ | ⋮ | ⋮ | ⋮ | ⋮ |
| DT2 | CA101 | SEC1 | SEN1 | BELOW SPRING | UP-DOWN | FM101 |
| DT2 | CA101 | SEC1 | SEN1 | BELOW SPRING | FRONT-REAR | FM102 |
| DT2 | CA101 | SEC1 | SEN1 | BELOW SPRING | LEFT-RIGHT | FM103 |
| DT2 | CA101 | SEC1 | SEN2 | ABOVE SPRING | UP-DOWN | FM104 |
| DT2 | CA101 | SEC1 | SEN2 | ABOVE SPRING | FRONT-REAR | FM105 |
| DT2 | CA101 | SEC1 | SEN2 | ABOVE SPRING | LEFT-RIGHT | FM106 |
| ⋮ | ⋮ | ⋮ | ⋮ | ⋮ | ⋮ | ⋮ |

| REGION OF INTEREST IDENTIFICATION CODE | RUNNING LANE IDENTIFICATION CODE | VEHICLE IDENTIFICATION CODE | MEASUREMENT DATE AND TIME | ACCELERATION SENSOR IDENTIFICATION CODE | MEASUREMENT DIRECTION | MONITORING RESULT | | |
|---|---|---|---|---|---|---|---|---|
| | | | | | | POSITIVE PEAK VALUE | NEGATIVE PEAK VALUE | EFFECTIVE VALUE |
| RI1 | DL1 | CA101 | DT11 | SEN1 | UP-DOWN | OOO | OOO | OOO |
| RI1 | DL1 | CA101 | DT12 | SEN1 | UP-DOWN | OOO | OOO | OOO |
| RI1 | DL1 | CA101 | DT13 | SEN1 | UP-DOWN | OOO | OOO | OOO |
| ⋮ | ⋮ | ⋮ | ⋮ | ⋮ | ⋮ | ⋮ | ⋮ | ⋮ |
| RI1 | DL1 | CA102 | DT21 | SEN1 | UP-DOWN | OOO | OOO | OOO |
| RI1 | DL1 | CA102 | DT22 | SEN1 | UP-DOWN | OOO | OOO | OOO |
| RI1 | DL1 | CA102 | DT23 | SEN1 | UP-DOWN | OOO | OOO | OOO |
| ⋮ | ⋮ | ⋮ | ⋮ | ⋮ | ⋮ | ⋮ | ⋮ | ⋮ |
| RI1 | DL2 | CA101 | DT31 | SEN1 | UP-DOWN | OOO | OOO | OOO |
| RI1 | DL2 | CA101 | DT32 | SEN1 | UP-DOWN | OOO | OOO | OOO |
| RI1 | DL2 | CA101 | DT33 | SEN1 | UP-DOWN | OOO | OOO | OOO |
| ⋮ | ⋮ | ⋮ | ⋮ | ⋮ | ⋮ | ⋮ | ⋮ | ⋮ |

FIG. 8

START ── CREATE DATABASE FOR REFERENCE ACCELERATION WAVEFORM

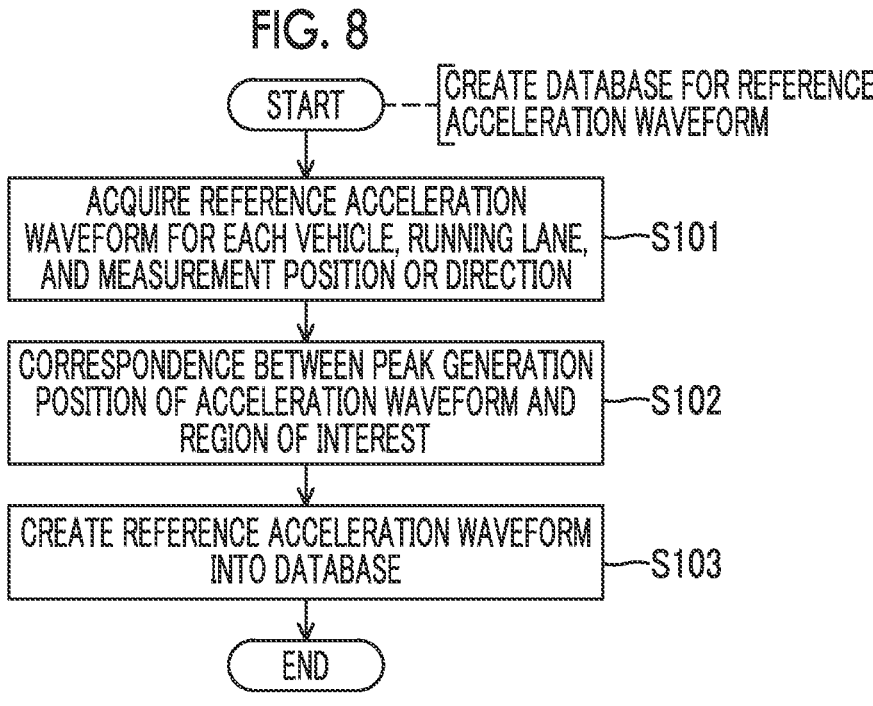

ACQUIRE REFERENCE ACCELERATION WAVEFORM FOR EACH VEHICLE, RUNNING LANE, AND MEASUREMENT POSITION OR DIRECTION ──S101

CORRESPONDENCE BETWEEN PEAK GENERATION POSITION OF ACCELERATION WAVEFORM AND REGION OF INTEREST ──S102

CREATE REFERENCE ACCELERATION WAVEFORM INTO DATABASE ──S103

END

FIG. 9

START ── MONITORING OF MEASUREMENT ACCELERATION WAVEFORM

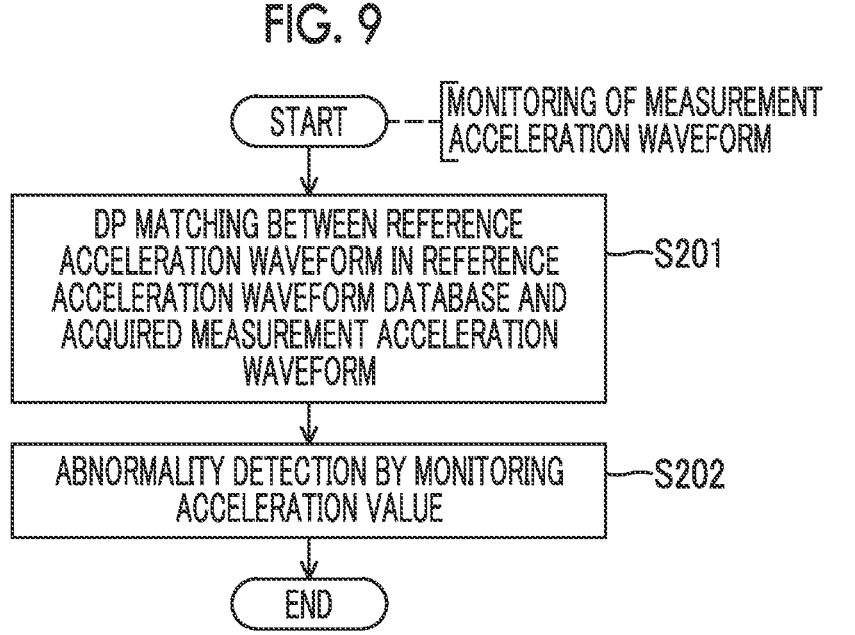

DP MATCHING BETWEEN REFERENCE ACCELERATION WAVEFORM IN REFERENCE ACCELERATION WAVEFORM DATABASE AND ACQUIRED MEASUREMENT ACCELERATION WAVEFORM ──S201

ABNORMALITY DETECTION BY MONITORING ACCELERATION VALUE ──S202

END

FIG. 14

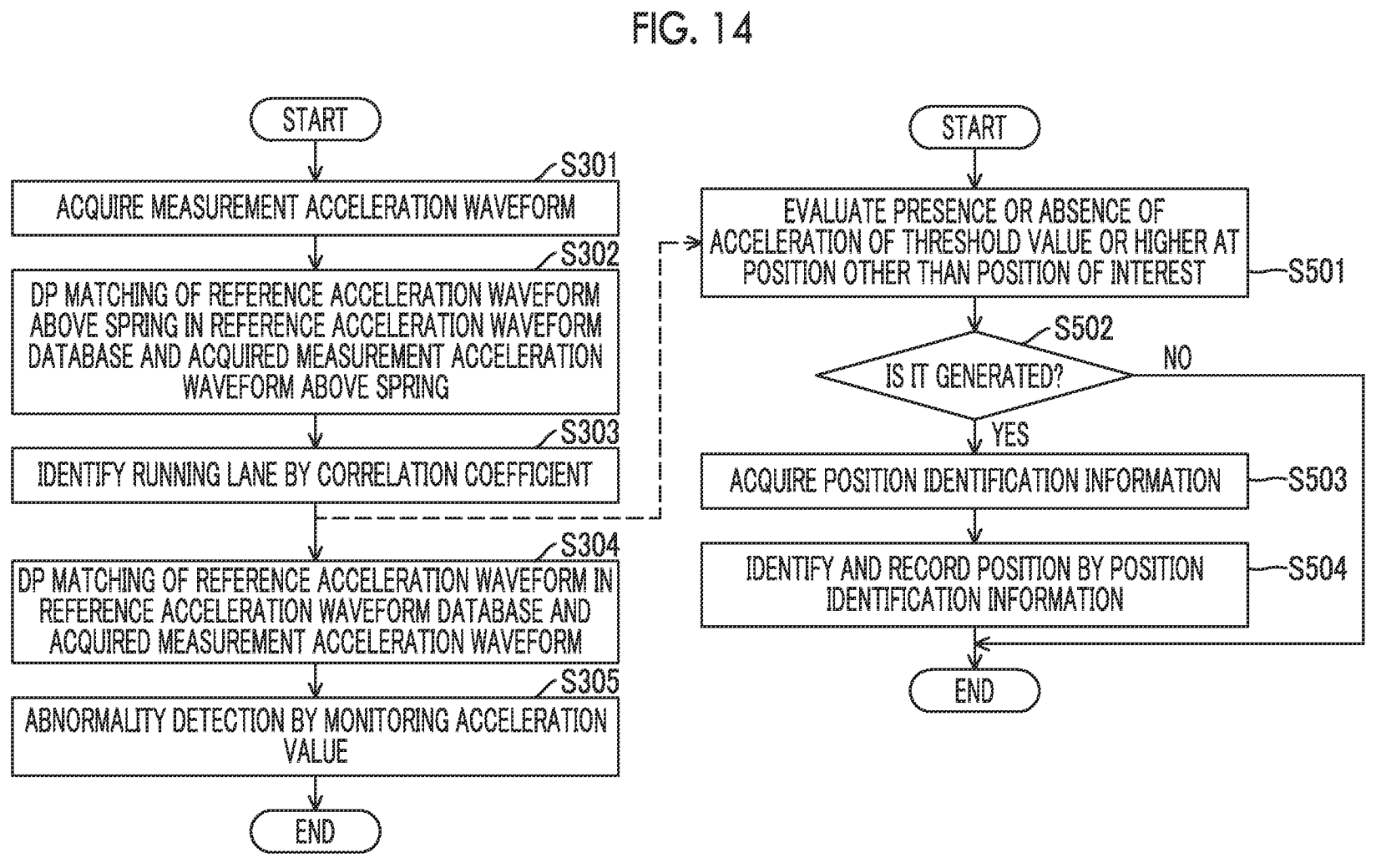

START

ACQUIRE MEASUREMENT ACCELERATION WAVEFORM — S301

DP MATCHING OF REFERENCE ACCELERATION WAVEFORM ABOVE SPRING IN REFERENCE ACCELERATION WAVEFORM DATABASE AND ACQUIRED MEASUREMENT ACCELERATION WAVEFORM ABOVE SPRING — S302

IDENTIFY RUNNING LANE BY CORRELATION COEFFICIENT — S303

DP MATCHING OF REFERENCE ACCELERATION WAVEFORM IN REFERENCE ACCELERATION WAVEFORM DATABASE AND ACQUIRED MEASUREMENT ACCELERATION WAVEFORM — S304

ABNORMALITY DETECTION BY MONITORING ACCELERATION VALUE — S305

END

START

EVALUATE PRESENCE OR ABSENCE OF ACCELERATION OF THRESHOLD VALUE OR HIGHER AT POSITION OTHER THAN POSITION OF INTEREST — S501

IS IT GENERATED? — S502

NO

YES

ACQUIRE POSITION IDENTIFICATION INFORMATION — S503

IDENTIFY AND RECORD POSITION BY POSITION IDENTIFICATION INFORMATION — S504

END

ACCELERATION MONITORING DEVICE, ACCELERATION MONITORING METHOD, AND PROGRAM

RELATED APPLICATIONS

The present application is a National Phase of International Application Number PCT/JP2021/044022 filed Dec. 1, 2021 and claims priority to Japanese Application Number 2021-024875 filed Feb. 19, 2021.

TECHNICAL FIELD

The present disclosure relates to an acceleration monitoring device, an acceleration monitoring method, and a program. This application claims priority based on Japanese Patent Application No. 2021-024875 filed in Japan on Feb. 19, 2021, and this content is incorporated herein by reference.

BACKGROUND ART

For example, in a case where an accelerometer is attached to a vehicle, acceleration data during running is acquired, and a state of the vehicle and a track is monitored, it is required to accurately identify a position of the vehicle. PTL 1 describes an example of a train position identifying method. The train position identifying method described in PTL 1 includes a step of acquiring curvature measurement data, a step of extracting a portion of the stored curvature data that minimizes the degree of divergence from measured curvature data, and acquiring the degree of divergence between the extracted portion and the measured curvature data as a minimum value of the degree of divergence, and a step of identifying a position of the train based on a distance position in the portion where the degree of divergence is minimum in a case where the minimum value of the degree of divergence is a threshold value or lower, and identifying a position of the train based on a running distance calculated from a running speed obtained from the axle rotation speed in a case where the minimum value of the degree of divergence exceeds the threshold value. That is, in the train position identifying method described in PTL 1, in a section where it is easy to collate the stored curvature data and the measured curvature data, the position is identified based on a collation result of the curvature, and in sections where it is not easy to collate, the position is identified based on the axle rotation speed.

CITATION LIST

Patent Literature

[PTL 1] Japanese Unexamined Patent Application Publication No. 2020-19333

SUMMARY OF INVENTION

Technical Problem

In a case where the position is identified by the train position identifying method described in PTL 1 described above, the position is identified based on the axle rotation speed in a section where it is not easy to identify the position based on the collation result of the curvature. Therefore, in the section where it is not easy to identify the position based on the collation result of the curvature, for example, there was a problem that the position may not be identified with high accuracy, in a case where it is difficult to accurately obtain the position from the integral of the axle rotation speed due to an error in the distance per rotation of the axle, wheel slippage, or the like.

The present disclosure has been made to solve the above problems, and an object thereof is to provide an acceleration monitoring device, an acceleration monitoring method, and a program capable of accurately identifying a position.

Solution to Problem

In order to solve the above-described problems, an acceleration monitoring device according to the present disclosure includes an acceleration monitoring device includes an acquisition unit that acquires a measurement acceleration waveform which is an acceleration waveform measured by a vehicle running on a track, a storage unit that stores a reference acceleration waveform which is an acceleration waveform as a reference for the measurement acceleration waveform for a predetermined region of interest which is a partial region of the track, and a monitoring unit that monitors an acceleration value of a non-linear expansion and contraction measurement acceleration waveform which is an acceleration waveform corresponding to the reference acceleration waveform by nonlinearly expanding and contracting a time axis of the measurement acceleration waveform.

An acceleration monitoring method according to the present disclosure includes a step of acquiring a measurement acceleration waveform which is an acceleration waveform measured by a vehicle running on a track, and a step of monitoring an acceleration value of a non-linear expansion and contraction measurement acceleration waveform which is an acceleration waveform corresponding to a reference acceleration waveform which is an acceleration waveform as a reference for the measurement acceleration waveform for a predetermined region of interest which is a partial region of the track by nonlinearly expanding and contracting a time axis of the measurement acceleration waveform.

A program according to the present disclosure that causes a computer to execute a step of acquiring a measurement acceleration waveform which is an acceleration waveform measured by a vehicle running on a track, and a step of monitoring an acceleration value of a non-linear expansion and contraction measurement acceleration waveform which is an acceleration waveform corresponding to a reference acceleration waveform which is an acceleration waveform as a reference for the measurement acceleration waveform for a predetermined region of interest which is a partial region of the track by nonlinearly expanding and contracting a time axis of the measurement acceleration waveform.

Advantageous Effects of Invention

According to the acceleration monitoring device, the acceleration monitoring method, and the program of the present disclosure, the position can be accurately identified.

BRIEF DESCRIPTION OF DRAWINGS

Figure 1:
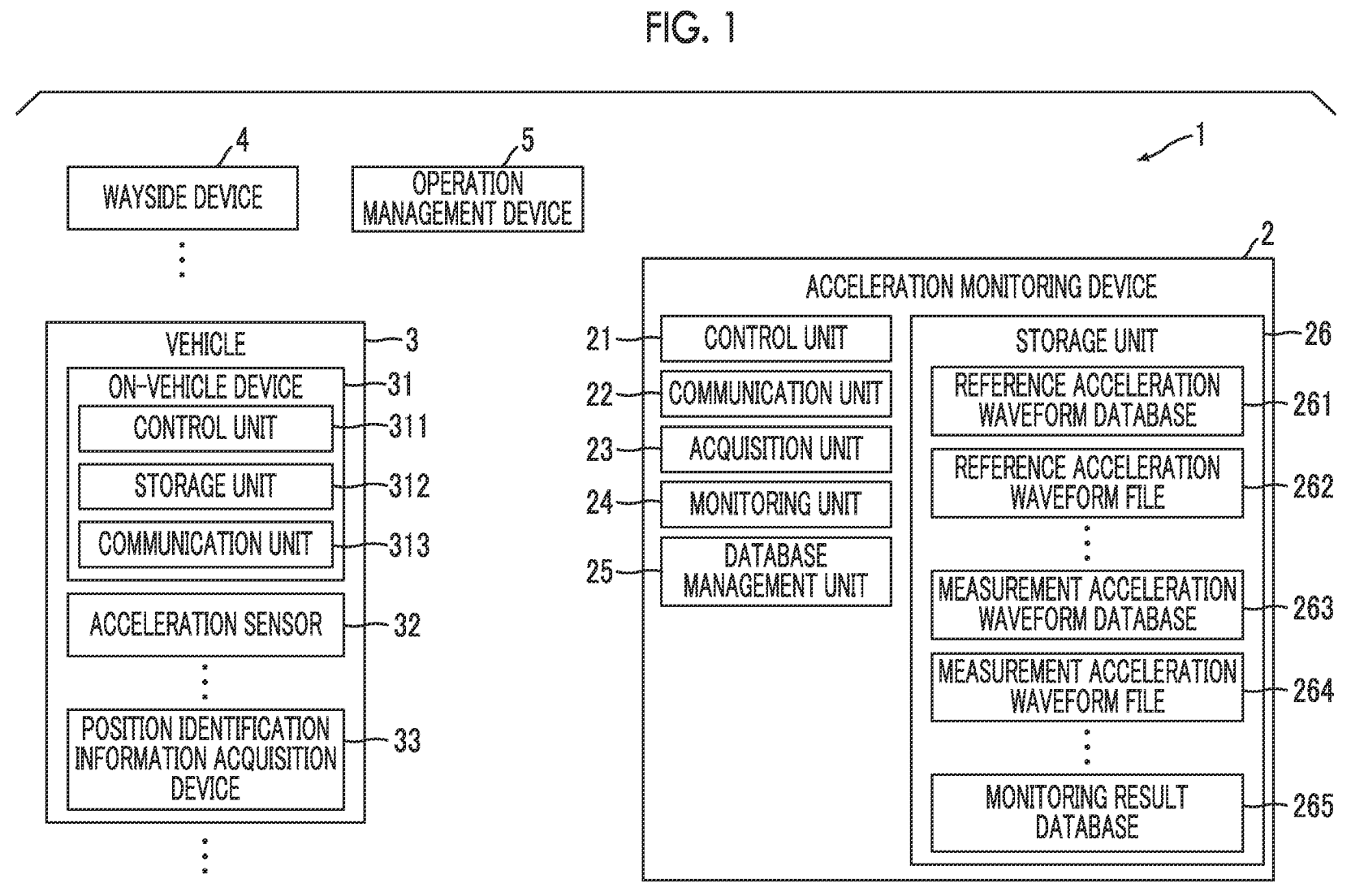

FIG. 1 is a block diagram for describing a configuration example of an acceleration monitoring device according to a first embodiment of the present disclosure.

FIG. 4 is a schematic table illustrating a configuration example of a reference acceleration waveform database 261 illustrated in FIG. 1.

FIG. 5 is a schematic table illustrating a configuration example of a measurement acceleration waveform database 263 illustrated in FIG. 1.

FIG. 7 is a schematic table illustrating a configuration example of a monitoring result database 265 illustrated in FIG. 1.

FIG. 8 is a flowchart illustrating an operation example of the acceleration monitoring device according to the first embodiment of the present disclosure.

FIG. 9 is another flowchart illustrating an operation example of the acceleration monitoring device according to the first embodiment of the present disclosure.

FIG. 14 is a flowchart illustrating an operation example of the acceleration monitoring device according to the fourth embodiment of the present disclosure.

DESCRIPTION OF EMBODIMENTS

Figure 2:
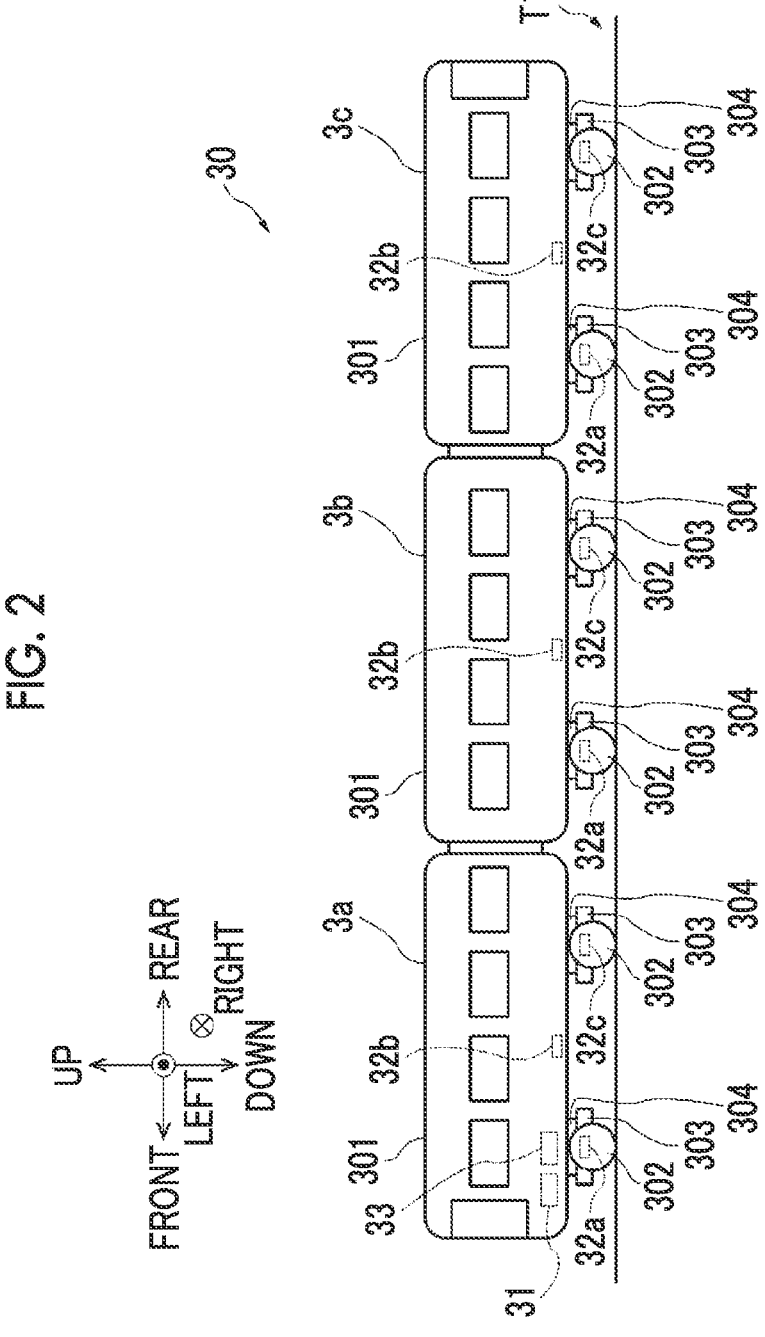
FIG. 2 is a side view illustrating an installation example of acceleration sensors 32 (acceleration sensors 32a to 32c) in vehicles 3 (vehicles 3a to 3c) illustrated in FIG. 1.

Hereinafter, an acceleration monitoring device, an acceleration monitoring method, and a program according to an embodiment of the present disclosure will be described with reference to the drawings. In each figure, the same reference numerals will be used for the same or corresponding configurations, and description thereof will be omitted as appropriate.

First Embodiment

Figure 3:
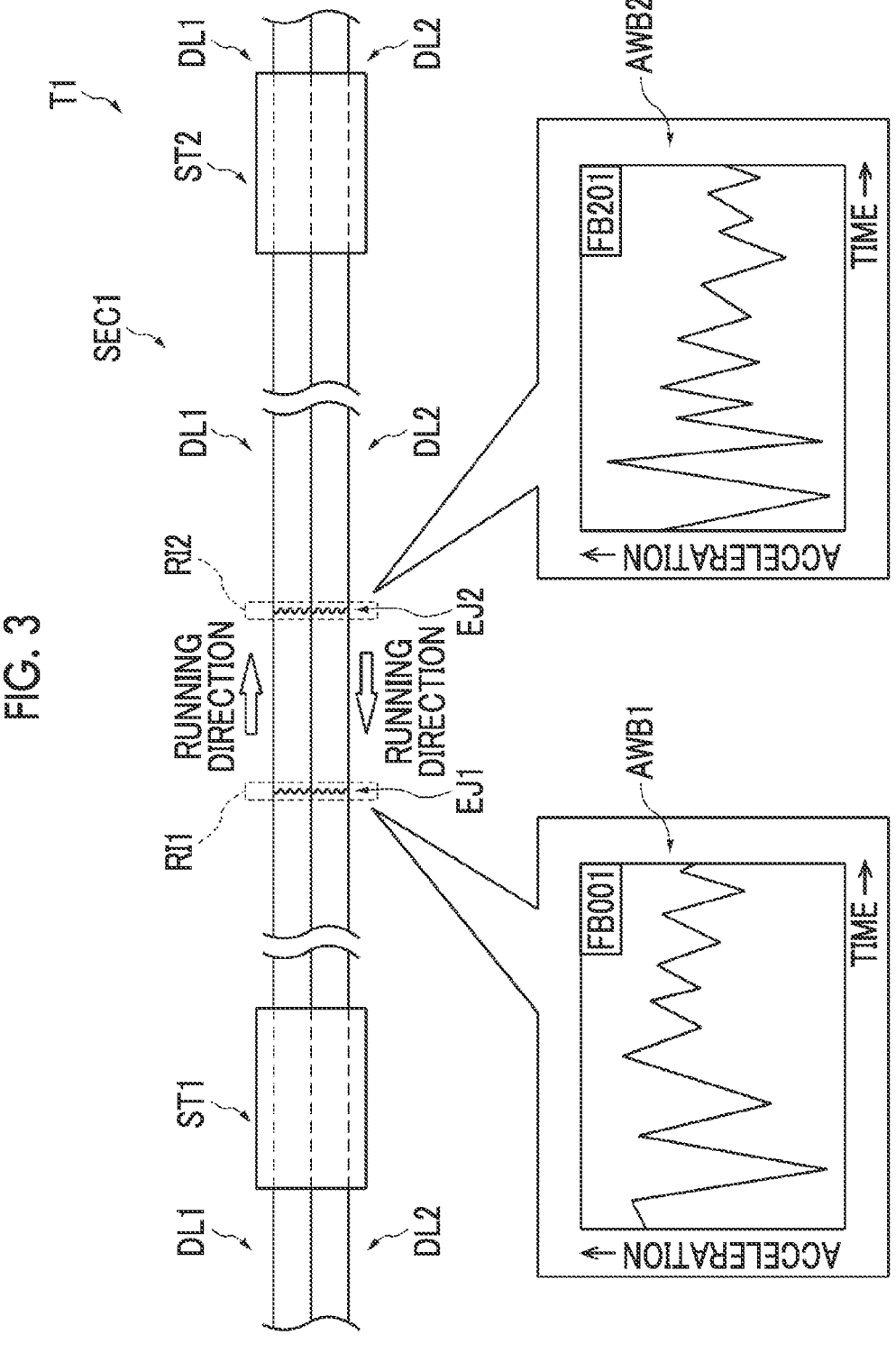
FIG. 3 is a plan view schematically illustrating a configuration example of a track according to the embodiment of the present disclosure.
Figure 6:
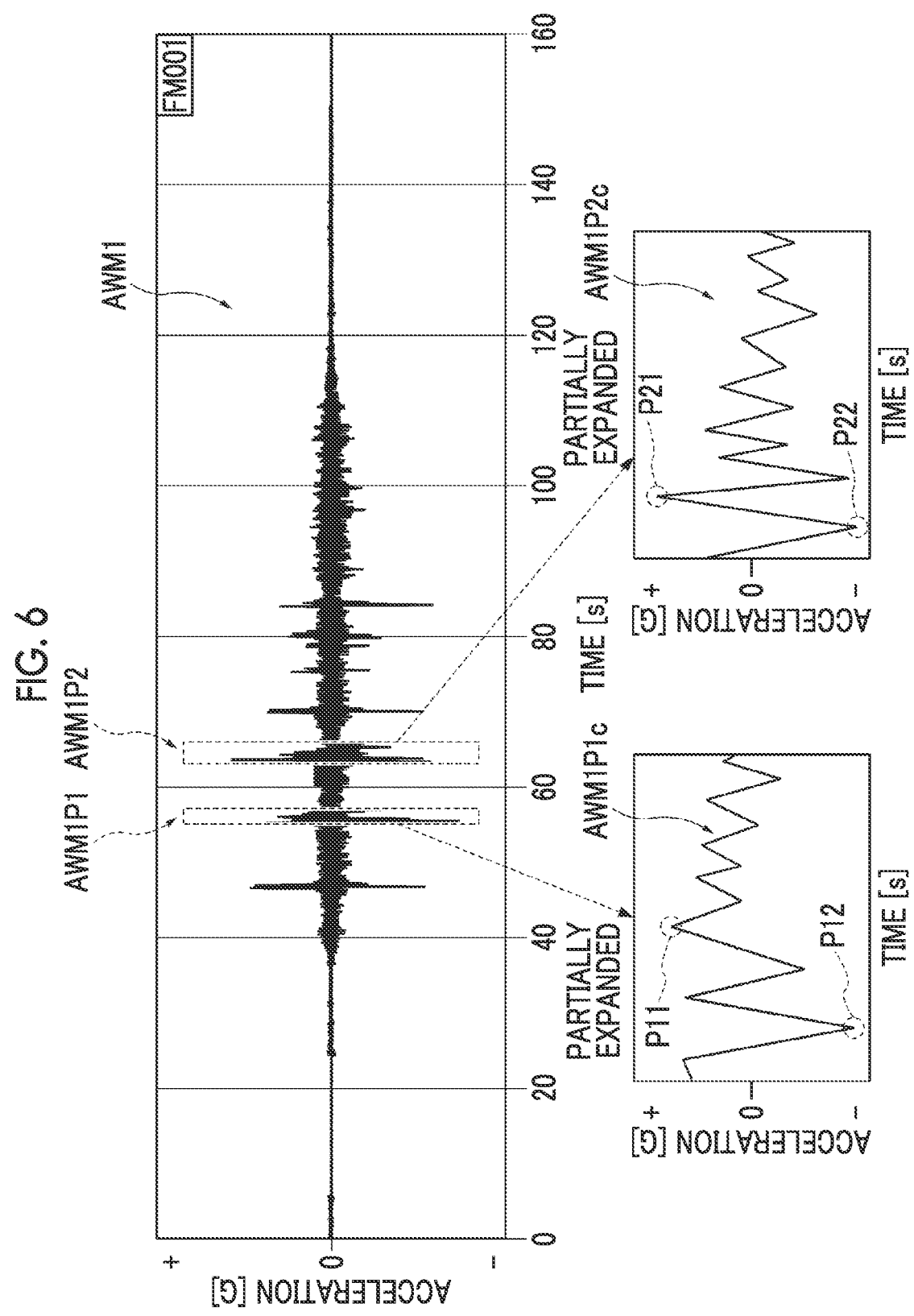
FIG. 6 is a schematic graph for describing an operation example of the acceleration monitoring device according to the embodiment of the present disclosure.
Figure 16:
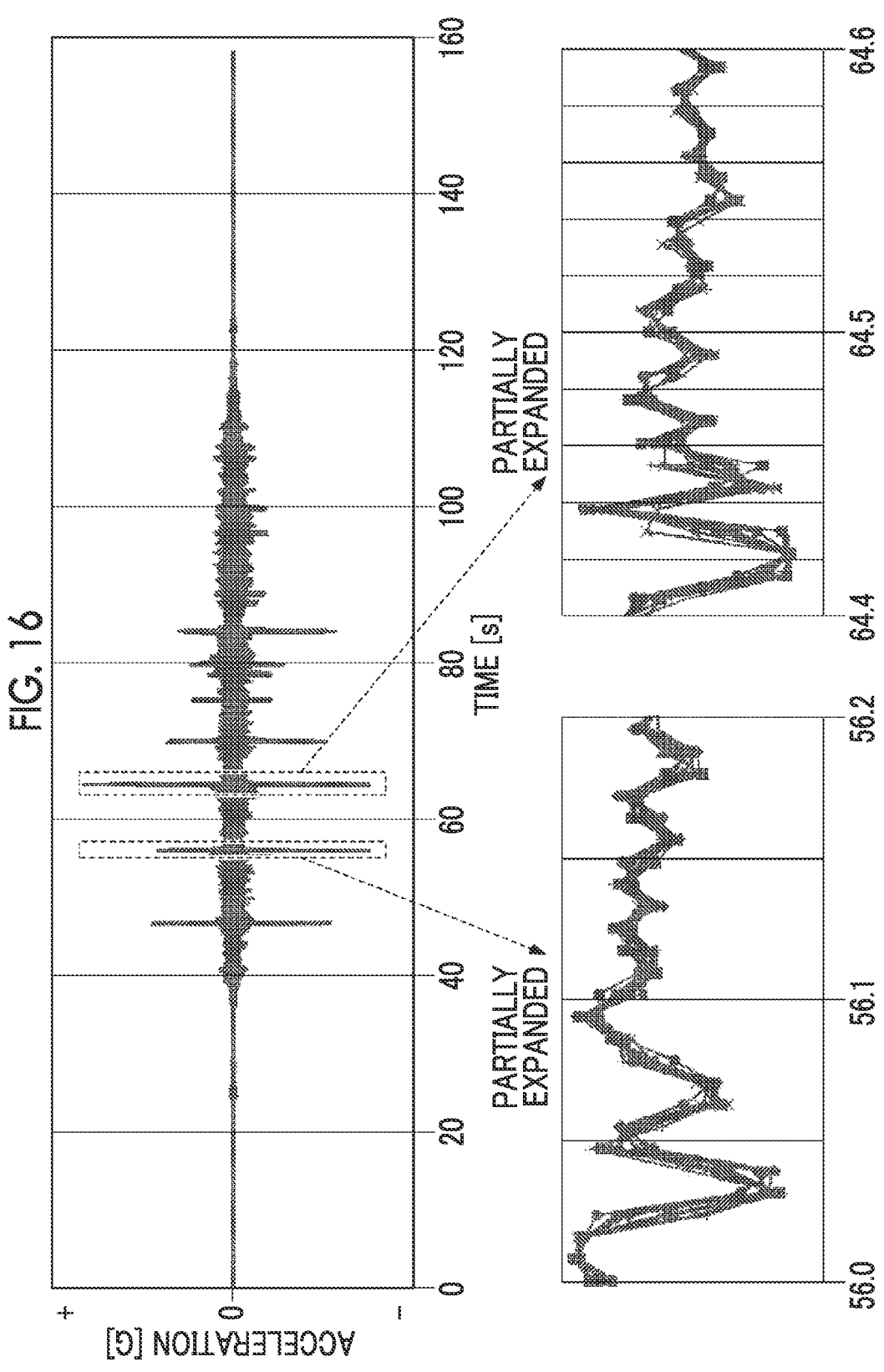
FIG. 16 is a waveform graph for describing an operation and effect of the acceleration monitoring device according to the embodiment of the present disclosure.
Figure 17:
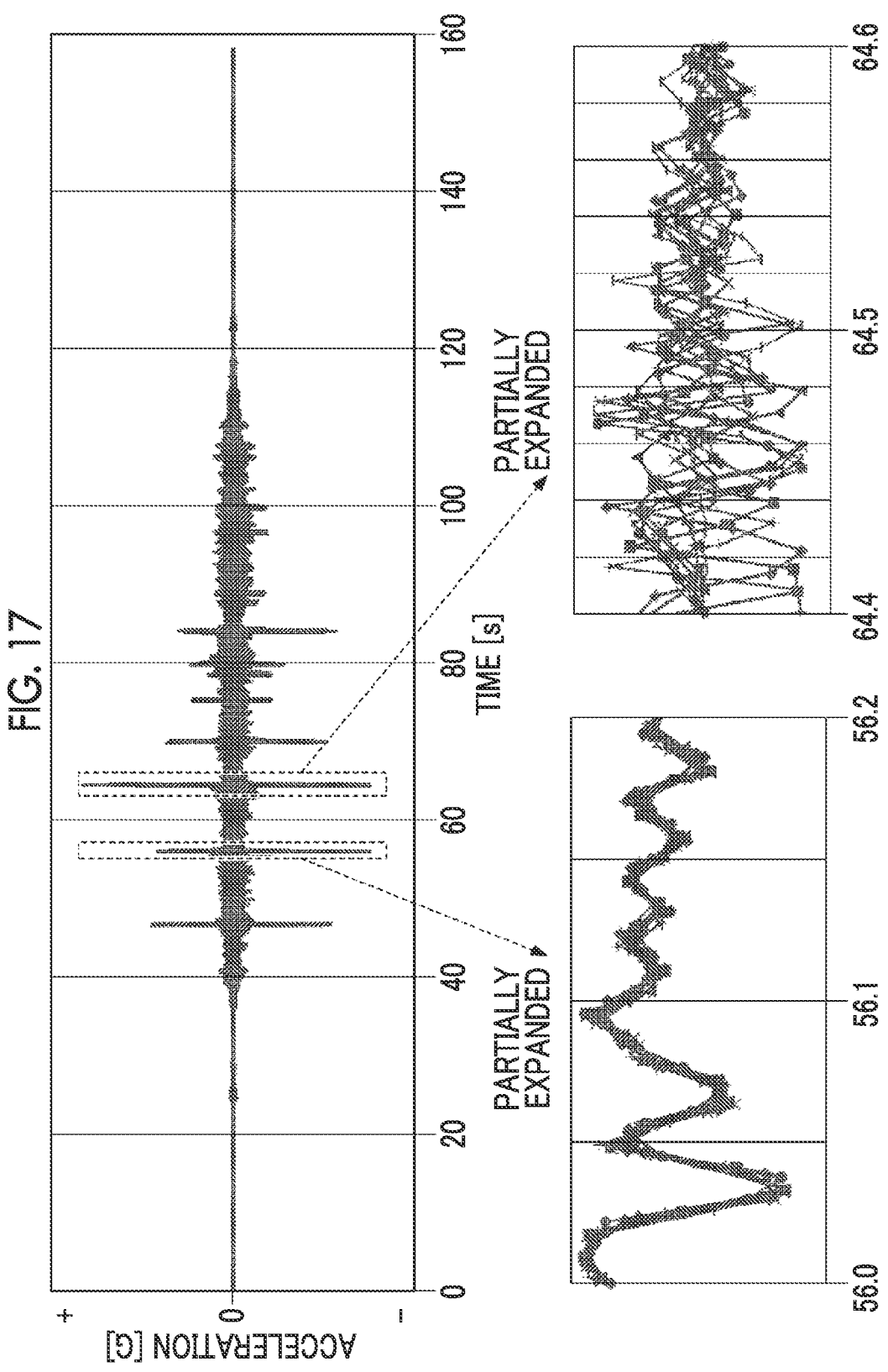
FIG. 17 is a waveform graph (comparative example) for describing the operation and effect of the acceleration monitoring device according to the embodiment of the present disclosure.

Hereinafter, an acceleration monitoring device, an acceleration monitoring method, and a program according to the first embodiment of the present disclosure will be described with reference to FIGS. 1 to 9 to 16 and 17. FIG. 1 is a block diagram for describing a configuration example of the acceleration monitoring device according to the first embodiment of the present disclosure. FIG. 2 is a side view schematically illustrating an installation example of acceleration sensors 32 (acceleration sensors 32a to 32c) in vehicles 3 (vehicles 3a to 3c) illustrated in FIG. 1. FIG. 3 is a plan view schematically illustrating a configuration example of a track T1 according to the embodiment of the present disclosure. FIG. 4 is a schematic table illustrating a configuration example of a reference acceleration waveform database 261 illustrated in FIG. 1. FIG. 5 is a schematic table illustrating a configuration example of a measurement acceleration waveform database 263 illustrated in FIG. 1. FIG. 6 is a schematic graph for describing an operation example of the acceleration monitoring device according to the embodiment of the present disclosure. FIG. 7 is a schematic table illustrating a configuration example of a monitoring result database 265 illustrated in FIG. 1. FIG. 8 is a flowchart illustrating an operation example of an acceleration monitoring device 2 according to the first embodiment of the present disclosure. FIG. 9 is another flowchart illustrating an operation example of the acceleration monitoring device 2 according to the first embodiment of the present disclosure. FIGS. 16 and 17 are waveform graphs for describing an operation and effect of the acceleration monitoring device according to the embodiment of the present disclosure.

(Configuration of Acceleration Monitoring Device 2)

As illustrated in FIG. 1, the acceleration monitoring device 2 is configured as, for example, one element of an automated guideway transit (AGT) 1. For example, the automated guideway transit 1 illustrated in FIG. 1 is provided with an acceleration monitoring device 2, a plurality of vehicles 3, a plurality of wayside devices 4, and an operation management device 5.

The operation management device 5 is a device that controls the operation of a plurality of trains including the plurality of vehicles 3, and transmits and receives a predetermined control signal to and from the vehicle 3 via the wayside device 4. For example, the wayside device 4 relays communication between the operation management device 5 and the vehicle 3.

In the present embodiment, the vehicle 3 runs on a track T1 illustrated in FIG. 3 as an example. The track T1 includes two running lane DL1 and running lane DL2 whose running directions are determined. In addition, the track T1 is provided with a station ST1 and a station ST2. In this case, one section SEC1 is from the station ST1 to the station ST2. In addition, a region of interest RI1 and a region of interest RI2, which are regions of a part of the track T1, are defined in advance as the track T1. In the present embodiment, the region of interest is a region in which the acceleration generated in the region of interest is to be monitored. In the example illustrated in FIG. 2, the region of interest RI1 and the region of interest RI2 are regions surrounding the expansion joint EJ1 and the expansion joint EJ2, respectively. On the track T1, relatively large acceleration is generated at a step such as an expansion joint or at a turnout position (not illustrated).

As illustrated in FIG. 1, the vehicle 3 is provided with an on-vehicle device 31, one or a plurality of acceleration sensors 32, and a position identification information acquisition device 33. The on-vehicle device 31 is provided with a control unit 311, a storage unit 312, and a communication unit 313 as a functional configuration configured by combining hardware and software.

In the on-vehicle device 31, the control unit 311 automatically controls a power source such as a motor, a steering device, or a boarding device (not illustrated) provided in the vehicle 3 based on a control signal received from the operation management device 5 by the communication unit 313 via the wayside device 4, and acquires the acceleration detected by the acceleration sensor 32 at a predetermined sampling cycle, stores the acceleration in the storage unit 313, and transmits the acceleration to the operation management device 5 via the wayside device 4 by the communication unit 313 at a predetermined timing, or acquires position identification information identified by the position identification information acquisition device 33 at a predetermined sampling cycle, stores the position identification information in the storage unit 312, and transmits the position identification information to the operation management device 5 via the wayside device 4 by the communication unit 313 at predetermined timing. For example, the on-vehicle device 31 collectively transmits the time-series data of the output of the acceleration sensor 32 acquired in one section between stations and the time-series data of the output of the position identification information acquisition device 33 to the operation management device 5 via the wayside device 4 when arriving at the station. However, the transmission timing of the acceleration data and the position identification information is not limited to this case.

For example, the acceleration sensor 32 detects acceleration of three axes and outputs the detection result to the control unit 311. The position identification information acquisition device 33 acquires information for identifying the position of the vehicle 3 and outputs the information to the control unit 311. For example, the position identification information acquisition device 33 acquires a signal corresponding to the rotation speed of a tire 302 (FIG. 2) provided on the vehicle 3 and outputs a signal representing the speed of the vehicle 3 as position identification information, or acquires the latitude and longitude representing the current position obtained by receiving radio waves emitted by satellites of the global positioning system (GPS) and outputs the latitude and longitude as position identification information.

A plurality of acceleration sensors 32 can be attached to the vehicles 3a to 3c constituting the train 30, respectively, as illustrated as acceleration sensors 32a to 32c in FIG. 2, for example. In the example illustrated in FIG. 2, each of the acceleration sensor 32a and the acceleration sensor 32c are attached to each of the two bogies 303 provided in each of the vehicles 3a to 3c, and the acceleration sensor 32b is attached to each vehicle body 301. In this case, the acceleration sensors 32a to 32c detect, for example, acceleration in three axes of front-rear, left-right, and up-down, and output a signal representing the detected acceleration. However, the acceleration to be measured may be any one direction or two directions, not all three directions. The bogie 303 rotatably supports the rubber tire 302 and is attached to the vehicle body 301 via a shock absorbing device 304 such as an air spring. In addition, in the example illustrated in FIG. 2, the on-vehicle device 31 and the position identification information acquisition device 33 are provided on the vehicle 3a.

On the other hand, the acceleration monitoring device 2 is provided with, for example, the control unit 21, the communication unit 22, the acquisition unit 23, the monitoring unit 24, a database management unit 25, and the storage unit 26 as a functional configuration configured to include a computer and a peripheral device and a peripheral circuit of the computer, and configured by combining hardware such as a computer and software such as a program executed by the computer.

In addition, the storage unit 26 stores the reference acceleration waveform database 261, a plurality of reference acceleration waveform files 262, the measurement acceleration waveform database 263, a plurality of measurement acceleration waveform files 264, and the monitoring result database 265.

The reference acceleration waveform database 261 is, for example, an acceleration waveform measured in each region of interest (region of interest RI1, region of interest RI2, or the like) in a standard vehicle 3, and is information for managing information on a reference acceleration waveform which is an acceleration waveform as a reference for a measurement acceleration waveform which is an acceleration waveform newly measured in each vehicle 3 to be monitored. FIG. 4 illustrates a configuration example of the reference acceleration waveform database 261. The reference acceleration waveform database 261 illustrated in FIG. 4 stores a region of interest identification code, a vehicle identification code, a section identification code, a running lane identification code, an acceleration sensor identification code, a measurement position, a measurement direction, and a reference acceleration waveform file name in association with each other. The region of interest identification code is a code that uniquely identifies the region of interest illustrated in FIG. 3. The vehicle identification code is a code that uniquely identifies the vehicle 3 in which the reference acceleration waveform is measured. The section identification code is a code that uniquely identifies a section in which the region of interest is located. The running lane identification code is a code that uniquely identifies the running lane in which the measured vehicle 3 runs. The acceleration sensor identification code is a code that uniquely identifies the measured acceleration sensor 32 or for each vehicle 3. The measurement position indicates whether the shock absorbing device 304 (spring) is on the vehicle body side (above a spring) or on the bogie side (below a spring). The measurement direction indicates whether the direction of the acceleration is the up-down direction, the front-rear direction, or the left-right direction. The reference acceleration waveform file name is the name of the reference acceleration file 262 representing the reference acceleration waveform. Row C1 in the reference acceleration waveform database 261 illustrated in FIG. 4 corresponds to, for example, a reference acceleration waveform AWB1 (file name "FB001") measured in the region of interest RI1 illustrated in FIG. 3. In addition, row C2 in the reference acceleration waveform database 261 illustrated in FIG. 4 corresponds to, for example, a reference acceleration waveform AWB2 (file name "FB201") measured in the region of interest RI2 illustrated in FIG. 3.

The reference acceleration waveform file 262 is a file representing the reference acceleration waveform measured in each of the regions of interest RI1 and R12.

The measurement acceleration waveform database 263 is information for managing information on the measurement acceleration waveform, which is an acceleration waveform measured for each section (each section SEC1 and the like) in each vehicle 3 to be monitored, for example. FIG. 5 illustrates a configuration example of the measurement acceleration waveform database 263. The measurement acceleration waveform database 263 illustrated in FIG. 5 stores a measurement date and time (year, month, day, hour, minute, and second), the vehicle identification code, the section identification code, the acceleration sensor identification code, the measurement position, the measurement direction, and a measurement acceleration waveform file name in association with each other. The vehicle identification code, the section identification code, the acceleration sensor identification code, the measurement position, and the measurement direction are the same as each item in the reference acceleration waveform database 261. The measurement acceleration waveform file name is the name of a measurement acceleration file 264 representing the measurement acceleration waveform. For example, the name of the file representing the measurement acceleration waveform AWM1 measured in the section SEC1 illustrated in FIG. 6 is "FM001".

The measurement acceleration waveform file 264 is a file that represents the measurement acceleration waveform measured by the vehicle 3 to be monitored.

The monitoring result database 265 is information summarizing the monitoring results (or evaluation results) of acceleration values (peak values, effective values, and the like) based on newly measured measurement acceleration waveforms for each region of interest (region of interest RI1, region of interest RI2, and the like). FIG. 7 illustrates a configuration example of the monitoring result database 265. The monitoring result database 265 illustrated in FIG. 7 stores the region of interest identification code, the running lane identification code, the vehicle identification code, the measurement date and time, the acceleration sensor identification code, the measurement direction, and the monitoring result in association with each other. The region of interest identification code, the running lane identification code, the vehicle identification code, the acceleration sensor identification code, and the measurement direction are the same as each item in the reference acceleration waveform database 261. In this example, the monitoring results are a positive peak value, a negative peak value, and an effective value measured in the region of interest.

The control unit 21 controls each unit 22 to 26. The communication unit 22 receives, for example, an acceleration waveform (time-series data of acceleration) (measurement acceleration waveform, and the like) which is time-series data of acceleration measured by the vehicle 3 from the operation management device 5, for example, for each section SEC1, according to an instruction of the control unit 21 (or acquisition unit 23). However, the communication unit 22 may directly receive, for example, the acceleration waveform measured by the vehicle 3 from the vehicle 3, for example, for each section SEC1, according to the instruction of the control unit 21 (or acquisition unit 23). FIG. 6 illustrates an example of the measurement acceleration waveform AWM1. For example, the control unit 21 (or acquisition unit 23) acquires (file including data indicating) the measurement acceleration waveform AWM1 from the operation management device 5, stores the measurement acceleration waveform file 264 in the storage unit 26, and registers information on the stored measurement acceleration waveform file 264 in the measurement acceleration waveform database 263. When acquiring the measurement acceleration waveform AWM1 from the operation management device 5, the control unit 21 (or acquisition unit 23) can acquire the measurement date and time of the measurement acceleration waveform AWM1, the identification code of the measured vehicle 3, the identification code of the measured section SEC1, the identification code of the measured acceleration sensor 32, information indicating the direction of acceleration and time-series data of the position identification information corresponding to the measurement acceleration waveform AWM1.

For example, the acquisition unit 23 acquires a measurement acceleration waveform (measurement acceleration waveform file 264) that is an acceleration waveform measured by the vehicle 3 running on the track T1 to be monitored (evaluated) from the storage unit 26 (or from vehicle 3).

The monitoring unit 24 monitors the acceleration value of a non-linear expansion and contraction measurement acceleration waveform, which is an acceleration waveform corresponding to the reference acceleration waveform by nonlinearly expanding and contracting the time axis of the measurement acceleration waveform.

The monitoring unit 24 first nonlinearly expands and contracts the time axis of the measurement acceleration waveform to be monitored (for example, the measurement acceleration waveform AWM1 illustrated in FIG. 6) and performs matching (correspondence; minimization of distance between two time-series data) with the reference acceleration waveform (for example, the reference acceleration waveform AWB1 or the reference acceleration waveform AWB2 illustrated in FIG. 3) which is the acceleration waveform as a reference. Therefore, the monitoring unit 24 obtains a non-linear expansion and contraction measurement acceleration waveform (for example, the non-linear expansion and contraction measurement acceleration waveform AWM1P1$c$ or the non-linear expansion and contraction measurement acceleration waveform AWM1P2$c$ in FIG. 6) which is an acceleration waveform corresponding to the reference acceleration waveform by nonlinearly expanding and contracting the time axis of the measurement acceleration waveform. As a method of performing non-linear expansion and contraction to increase the correlation coefficient between waveforms, there are methods such as dynamic programming (DP) matching (matching method by a dynamic planning method) and dynamic time warping. The non-linear expansion and contraction measurement acceleration waveform AWM1P1$c$ is an acceleration waveform corresponding to the reference acceleration waveform AWB1 by nonlinearly expanding and contracting the time axis of the acceleration waveform AWM1P1 which is a part of the measurement acceleration waveform AWM1. In addition, the non-linear expansion and contraction measurement acceleration waveform AWM1P2$c$ is an acceleration waveform corresponding to the reference acceleration waveform AWB2 by nonlinearly expanding and contracting the time axis of the acceleration waveform AWM1P2 as a part of the measurement acceleration waveform AWM1.

Next, the monitoring unit 24 monitors (evaluates) an acceleration value of the non-linear expansion and contraction measurement acceleration waveform (for example, the non-linear expansion and contraction measurement acceleration waveform AWM1P1$c$ or the non-linear expansion and contraction measurement acceleration waveform AWM1P2$c$ in FIG. 6). For example, the monitoring unit 24 obtains the maximum value of the positive peak value P11 and the maximum value or the effective value of the negative peak value P12 of the non-linear expansion and contraction measurement acceleration waveform AWM1P1$c$ illustrated in FIG. 6 to register these values in the monitoring result database 265, or obtains the maximum value of the positive peak value P21, the maximum value of the negative peak value P22 or the effective value of the non-linear expansion and contraction measurement acceleration waveform AWM1P2$c$ illustrated in FIG. 6 to register these values in the monitoring result database 265. Alternatively, the monitoring unit 24 determines the presence or absence of an abnormality by, for example, comparing with the reference acceleration waveform AWB1 or the reference acceleration waveform AWB2, comparing with the measurement acceleration waveforms of the same vehicle 3 or another vehicle 3, or comparing with a predetermined threshold value or the like.

In addition, the database management unit 25 constructs or changes the reference acceleration waveform database 261, searches, displays, or prints data registered in the monitoring result database 265, for example, according to a predetermined input operation by the operator.

(Operation Example of Acceleration Monitoring Device 2)

Next, an operation example of the acceleration monitoring device 2 illustrated in FIG. 1 will be described with reference to FIGS. 8 and 9. FIG. 8 illustrates an example of processing of creating the reference acceleration waveform database 261. FIG. 9 illustrates an example of processing when monitoring the measurement acceleration waveform.

As illustrated in FIG. 8, when constructing the reference acceleration waveform database 261, first, the communication unit 22 and the acquisition unit 23 are used, and for example, the reference acceleration waveform for each vehicle, running lane, and measurement position or direction is acquired off-line from the vehicle 3 (or online via the operation management device 5 or the like) (step S101). Next, correspondence between the peak generation position of the acceleration waveform and the region of interest is performed using the database management unit 25 (step S102). The reference acceleration waveform is created into a database using the database management unit 25 (step S103).

In addition, as illustrated in FIG. 9, when the measurement acceleration waveform is monitored, using the monitoring unit 24, DP matching is performed between a plurality of reference acceleration waveforms in the reference acceleration waveform database 261 and the acquired measurement acceleration waveform (step S201), an acceleration waveform corresponding to the region of interest included in the measurement acceleration waveform is identified, and abnormality detection is performed by monitoring the acceleration value (step S202).

(Supplementary Description, Action, Effect, and the like of First Embodiment)

In the present embodiment, an acceleration waveform as a reference is set in advance. The acceleration may be in any of the three axes (front-rear, left-right, and up-down). The acceleration waveform is the acceleration in the translational direction. For example, in the case of vertical acceleration, a large acceleration is generated at the expansion joint position or the like, and, the correspondence between the generation timing of the peak acceleration and the expansion joint position is set in advance for the acceleration waveform as a reference. The time axis of the waveform to be monitored is nonlinearly expanded and contracted, and matching with the acceleration waveform as a reference is performed.

By nonlinearly expanding and contracting the time axis of the target waveform, it is possible to automatically and substantially match the reference waveform and the peak position. It is easy to monitor the progress of acceleration at a position where an acceleration peak occurs, such as an expansion joint.

In addition, by monitoring based on the characteristics of acceleration that always occurs at expansion joints, turnout, guide rail joints, and the like existing on the track, rather than data that depends on the curvature of the track, such as yaw angular velocity, it is possible to identify the acceleration peak position with high accuracy even in a section with a curvature of zero, such as a straight section.

That is, according to the present embodiment, it is possible to easily extract the peak acceleration at a characteristic position of the track only by comparison with the reference acceleration waveform without using GPS, vehicle speed information, or the like, and to identify the position with high accuracy.

In a case where an accelerometer is attached to a vehicle, acceleration data during running is acquired, and the state of the vehicle and the track is monitored, an impact acceleration is generated at a step such as an expansion joint or at a turnout position on the track. By constantly monitoring the acceleration, it is possible to monitor the state of the expansion joint. In a case of trying to evaluate the acceleration at the target expansion joint position from the acceleration data, it is necessary to acquire the position information, and it is difficult to obtain an accurate position by integration from speed data due to errors in tire diameter, tire slippage, and the like. In a case where a large number of track antenna beacons are installed on the track to improve the position estimation accuracy, the cost increases. In a case where the GPS data is used, the position estimation accuracy in a section having a ceiling such as a station is lowered. In a case where the time waveforms of the accelerations are compared only by moving the time back and forth, it is difficult to evaluate the peak value at another position due to variations in vehicle running or the like even if the acceleration at a certain peak position is matched. In addition, in a case where the position is identified from the characteristics of the curve position of the track by using the yaw angular velocity data, in the straight running section, the generated yaw angular velocity is zero in the map information. Therefore, in a case where the straight section is long, it is considered difficult to accurately determine the position. According to the present embodiment, since the position can be identified by using the translational acceleration, these problems can be solved and the position (the region of interest) can be identified with high accuracy.

FIGS. 16 and 17 illustrate examples of acceleration waveforms in a case where the same vehicle runs 10 times under the same track and speed conditions. FIG. 16 illustrates an enlarged waveform of the reference acceleration waveform and the non-linear expansion and contraction measurement acceleration waveform in a case where DP matching is performed using one waveform out of ten times as the reference acceleration waveform. FIG. 17 illustrates enlarged waveforms approximately 56 seconds and approximately 64.4 seconds in a case where 10 waveforms are matched at acceleration peaks approximately 56 seconds. In the example illustrated in FIG. 17, even if the timing of a certain acceleration peak position is adjusted to match, the timing of generation position of the another acceleration peak deviates, so that it takes time for evaluation. On the other hand, in the case of performing DP matching, the generation position of the acceleration peak are accurately associated with each other as illustrated in FIG. 16.

Second Embodiment

Figure 10:
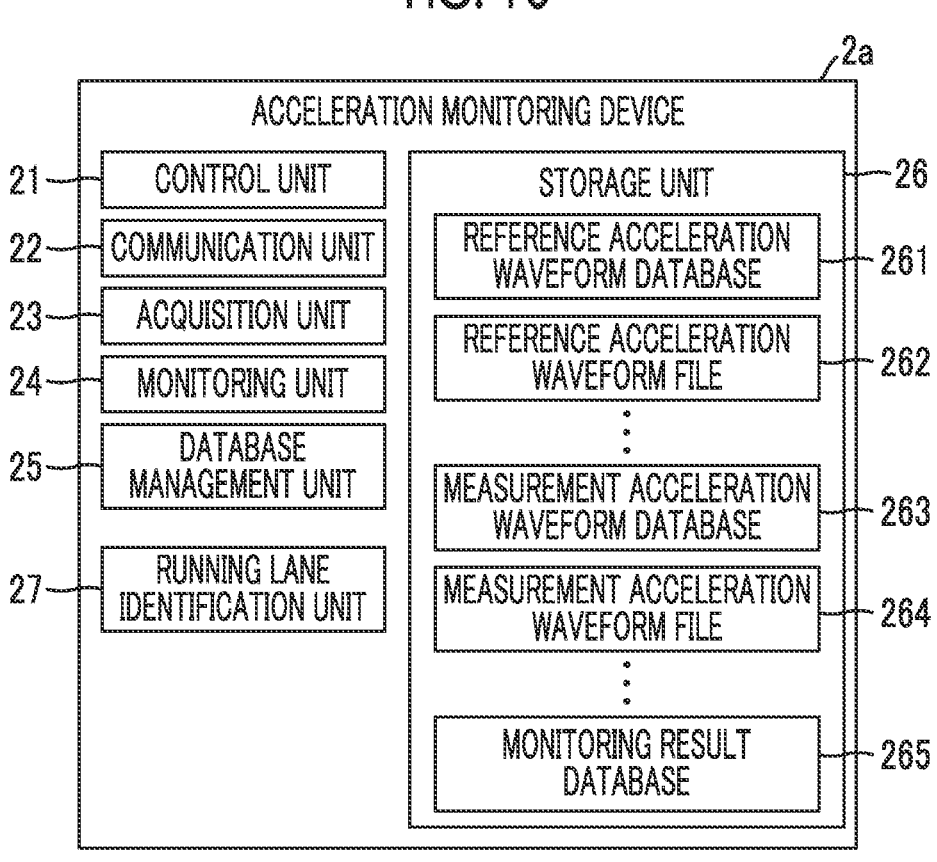
FIG. 10 is a block diagram illustrating a configuration example of an acceleration monitoring device according to a second embodiment of the present disclosure.
Figure 11:
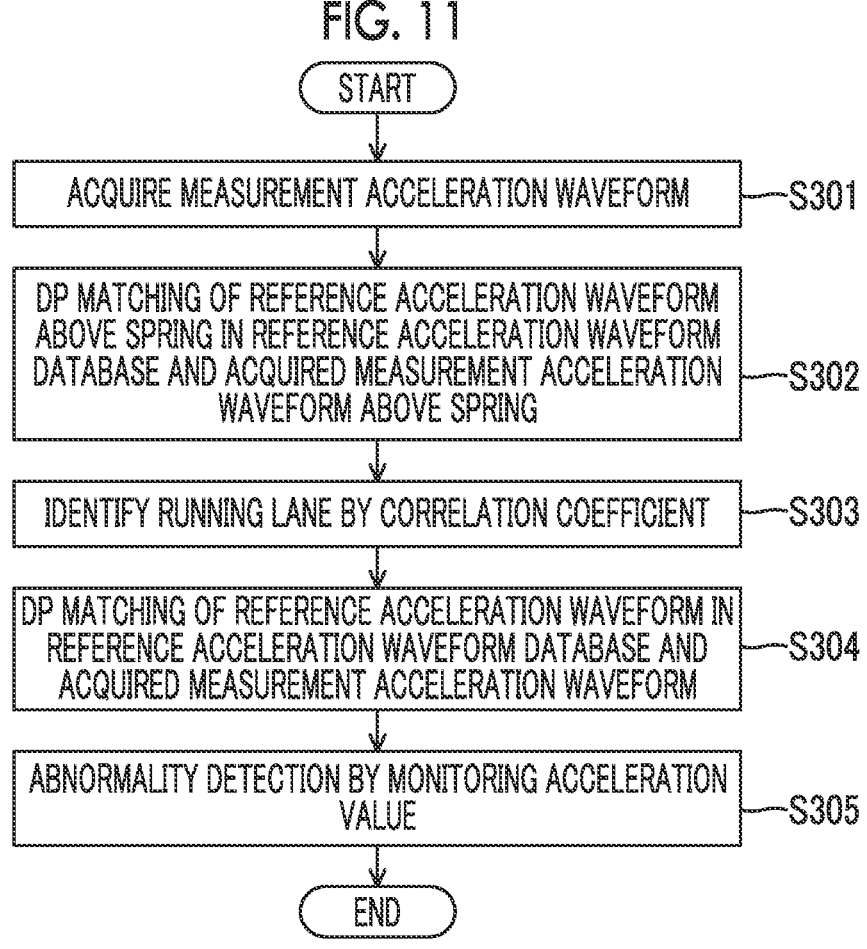
FIG. 11 is a flowchart illustrating an operation example of the acceleration monitoring device according to the second embodiment of the present disclosure.

An acceleration monitoring device 2a (corresponding to the acceleration monitoring device 2 of the first embodiment) according to a second embodiment of the present disclosure will be described with reference to FIGS. 10 and 11. FIG. 10 is a block diagram illustrating a configuration example of the acceleration monitoring device according to the second embodiment of the present disclosure. FIG. 11 is a flowchart illustrating an operation example of the acceleration monitoring device according to the second embodiment of the present disclosure. The acceleration monitoring device 2a according to the second embodiment illustrated in FIG. 10 is different from the acceleration monitoring device 2 according to the first embodiment illustrated in FIG. 1 in that the acceleration monitoring device 2a is newly provided with a running lane identification unit 27. The running lane identification unit 27 identifies the running lane by comparing each correlation coefficient between each non-linear expansion and contraction measurement acceleration waveform which is each acceleration waveform corresponding to each reference acceleration waveform for each running lane by nonlinearly expanding and contracting the time axis of the measurement acceleration waveform, and each corresponding reference acceleration waveform. In addition, the monitoring unit 24 monitors the acceleration value of the non-linear expansion and contraction measurement acceleration waveform in which the time axis of the measurement acceleration waveform is nonlinearly expanded and contracted so as to correspond to the reference acceleration waveform of the identified running lane.

In the second embodiment, the vehicle 3 is provided with the vehicle body 301, the bogie 303, and the shock absorbing device 304 provided between the vehicle body 301 and the bogie 303, and the measurement acceleration waveform include a first measurement acceleration waveform measured by the acceleration sensor 32b (first acceleration sensor) above the spring attached to the vehicle body 301 and a second measurement acceleration waveform measured by the acceleration sensors 32a and 32c (second acceleration sensors) attached to the bogie 303. In addition, the reference acceleration waveform includes a first reference acceleration waveform for each running lane corresponding to the first acceleration sensor and a second reference acceleration waveform for each running lane corresponding to the second acceleration sensor. The running lane identification unit 27 may identify the running lane by comparing each correlation coefficient between each non-linear expansion and contraction measurement acceleration waveform corresponding to each first reference acceleration waveform for each running lane by nonlinearly expanding and contracting the time axis of the first measurement acceleration waveform, and each corresponding first reference acceleration waveform.

In addition, as illustrated in FIG. 11, in the acceleration monitoring device 2a according to the second embodiment, the running lane can be identified by the flow of acquiring the measurement acceleration waveform (step S301), DP matching of the reference acceleration waveform above the spring in the reference acceleration waveform database 261 and the acquired measurement acceleration waveform above the spring (step S302), and identifying the running lane by the correlation coefficient (step S303). In this case, information for identifying the running lane is not required for the measurement acceleration waveform. DP matching of the reference acceleration waveform in the reference acceleration waveform database 261 and the acquired measurement acceleration waveform (step S304) and abnormality detection by monitoring the acceleration value (step S305) can be executed based on an identification result of the running lane.

In the second embodiment, after acquiring the reference acceleration waveform for each vehicle, running lane, and measurement position or direction in advance, the reference acceleration waveform database 261 is constructed by associating the reference acceleration waveform with the peak generation position of the acceleration waveform. The acceleration waveform is the acceleration in the translational direction. The correlation coefficients are compared after performing non-linear expansion and contraction on the time axis of the acquired acceleration data (similar to that of the first embodiment) for each of the acceleration waveforms as references created into a database. It is determined that the section and the running lane in which the acceleration waveform as a reference for which the correlation coefficient is highest is running are the section and the running lane in which the acquired acceleration data is running.

In a case where the target acceleration waveform includes a high frequency component, the peak value of the waveform may not be captured depending on the acquired sampling frequency, and the correlation coefficient may be lowered even in the same running section. As a countermeasure, it is desirable to perform analysis on the acceleration above the spring (in the case of AGT, the vehicle body after passing through the air spring) or the acceleration waveforms in which the high frequency components are cut.

After the running lane can be identified, not only the acceleration above the spring but also the acceleration below the spring can be subjected to non-linear expansion and contraction on the time axis, and the peak acceleration generated in the reference acceleration waveform can be compared and evaluated.

As described above, according to the second embodiment, it is possible to identify the section or the running lane from which the target acceleration data is acquired only from the characteristics of the acceleration waveform without using GPS or vehicle speed information.

Third Embodiment

Figure 12:
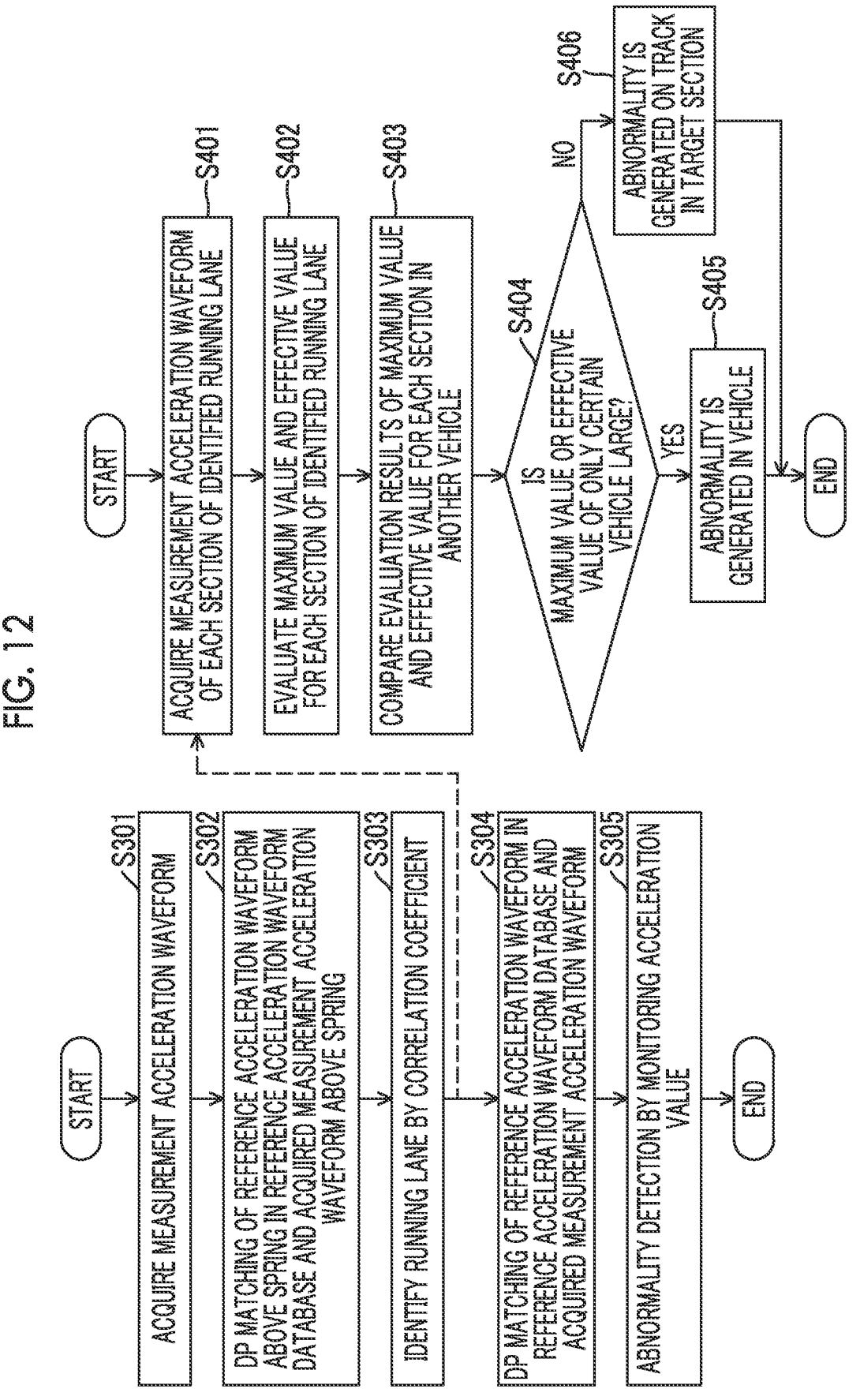
FIG. 12 is a flowchart illustrating an operation example of an acceleration monitoring device according to a third embodiment of the present disclosure.

An acceleration monitoring device 2a according to a third embodiment of the present disclosure (the configuration is the same as that of the second embodiment and the operation of the monitoring unit 24 is partially different) will be described with reference to FIG. 12. FIG. 12 is a flowchart illustrating an operation example of the acceleration monitoring device according to the third embodiment of the present disclosure. In the third embodiment, in a case where the acceleration value for each predetermined section of the non-linear expansion and contraction measurement acceleration waveform corresponding to the measurement acceleration waveform measured by the first vehicle 3 exceeds a predetermined threshold value for each section, the monitoring unit 24 determines whether there is an abnormality in the first vehicle or on the track, based on the result of comparison between the acceleration value for each section of the non-linear expansion and contraction measurement acceleration waveform corresponding to the measurement acceleration waveform measured by the second vehicle and the threshold value for each section.

As illustrated in FIG. 12, in the third embodiment, in the acceleration monitoring device 2a, the acquisition unit 23 acquires the measurement acceleration waveform of each section of the running lane identified by the running lane identification unit 27 (step S401), and the monitoring unit 24 evaluates the maximum value and the effective value for each section of the identified running lane (step S402), compares the evaluation results of the maximum value and the effective value for each section in another vehicle (step S403), determines that an abnormality is generated in a certain vehicle (step S405) in a case where the maximum value or the effective value of only a certain vehicle is relatively large (when "YES" in step S404), and determines that an abnormality is generated on the track in the target section (step S406) in a case where the maximum value of a certain vehicle is not relatively large and the effective value is not relatively large (when "NO" in step S404).

Evaluation of the expansion joint position of the track and the like can be easily performed by the analysis according to the first and second embodiments, but it is not possible to evaluate an increase in road surface unevenness at a position not of interest or an abnormality of the vehicle itself. On the other hand, in the third embodiment, it is possible to evaluate whether or not the maximum value or the effective value of the absolute acceleration value for each section between stations is the threshold value or higher. As a result, it possible to monitor whether or not a large acceleration is generated at a position other than the expected position.

In addition, the acceleration and effective value of the measured acceleration are compared with the acceleration of another vehicle running in the same section, and if the ratio is the set threshold value or higher, it can be determined that an abnormality is occurred in the vehicle.

Hereinbefore, according to the third embodiment, it is possible to evaluate whether or not the acceleration is deteriorated not only at the characteristic position of the track such as the expansion joint but also at an unexpected position. In addition, by comparing the accelerations of different vehicles with each other, it is possible to determine whether an abnormality is generated either on the track or in the vehicle.

Fourth Embodiment

Figure 13:
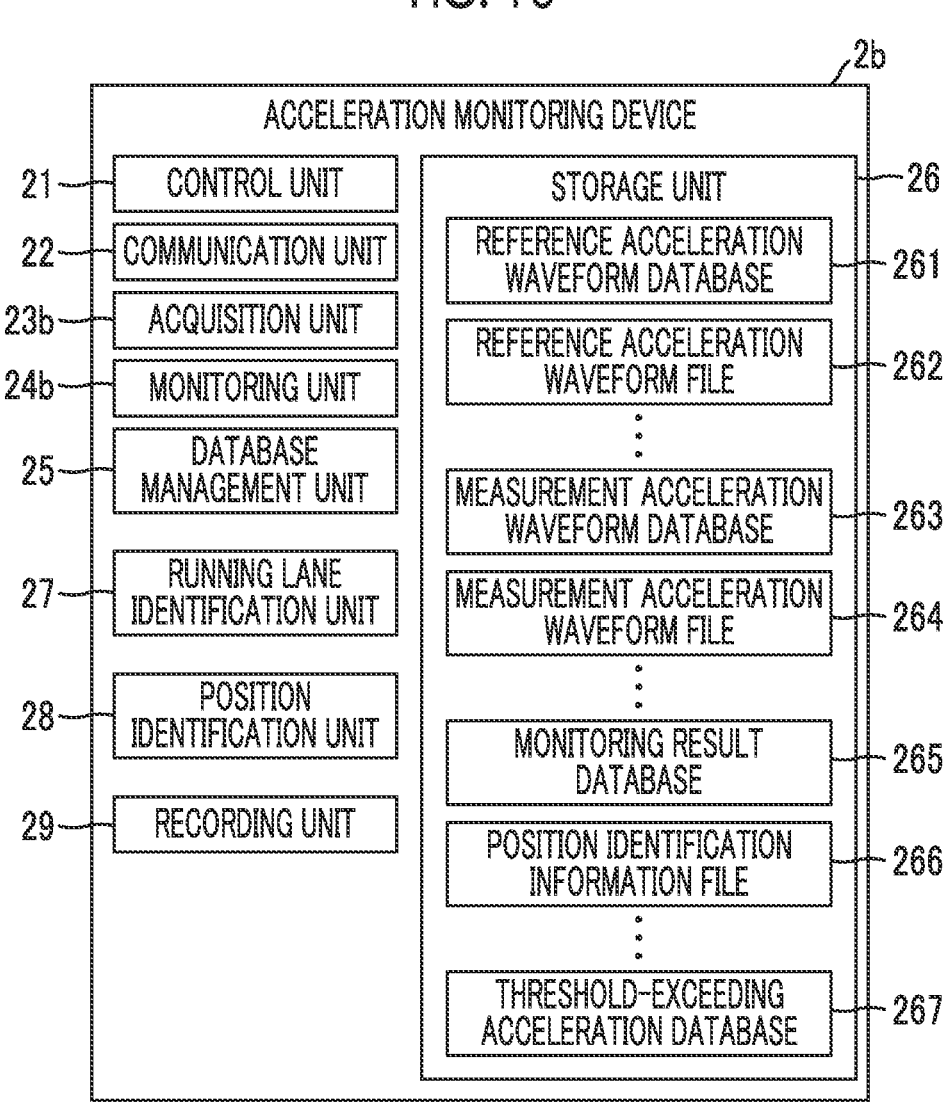
FIG. 13 is a block diagram illustrating a configuration example of an acceleration monitoring device according to a fourth embodiment of the present disclosure.

An acceleration monitoring device 2b (corresponding to the acceleration monitoring device 2a of the second embodiment) according to a fourth embodiment of the present disclosure will be described with reference to FIGS. 13 and 14. FIG. 13 is a block diagram illustrating a configuration example of the acceleration monitoring device according to the fourth embodiment of the present disclosure. FIG. 14 is a flowchart illustrating an operation example of the acceleration monitoring device according to the fourth embodiment of the present disclosure. The acceleration monitoring device 2b according to the fourth embodiment illustrated in FIG. 13 is different from the acceleration monitoring device 2a according to the second embodiment illustrated in FIG. 10 in that the acceleration monitoring device 2b is newly provided with a position identification unit 28 and a recording unit 29, the storage unit 26 stores the position identification information file 266 corresponding to the measurement acceleration waveform file 264 and a threshold-exceeding acceleration database 267, an acquisition unit 23b (corresponding to the acquisition unit 23) acquires position identification information from the vehicle 3 and stores the position identification information in the storage unit 26 as the position identification information file 266, or reads and acquires the position identification information file 266 from the storage unit 26, and a monitoring unit 24b (corresponding to the monitoring unit 24) further monitors (evaluates) the acceleration value other than the region of interest.

In the fourth embodiment, the acquisition unit 23b further acquires the position identification information associated with the measurement acceleration waveform. In addition, in a case where the acceleration value of the measurement acceleration waveform other than the measurement acceleration waveform corresponding to the reference acceleration waveform by nonlinearly expanding and contracting the time axis exceeds a predetermined threshold value, the position identification unit 28 identifies the generation position of the acceleration value exceeding the threshold value based on the position identification information. The recording unit 29 records the value of the acceleration value and the generation position of the acceleration value exceeding the threshold value in the threshold-exceeding acceleration database 267. The threshold-exceeding acceleration database 267 is, for example, information that associates the measurement date and time with the generation position and the acceleration value.

In a case where the position identification information is information corresponding to the speed of the vehicle 3, the position identification unit 28 can identify the generation position based on the integrated value of the speed with reference to the position of the nearest region of interest.

As illustrated in FIG. 14, in the fourth embodiment, the monitoring unit 24b evaluates the presence or absence of acceleration of the threshold value or higher at a position other than the position of interest (step S501), in a case where the acceleration is generated (when "YES" in step S502), the position identification unit 28 identifies the position by the position identification information (step S503), and the recording unit 29 records the position, the acceleration value, and the like (step S504).

In the third embodiment, in a case where a large acceleration occurs at a position other than the position of interest, such as the position of the expansion joint of the track, the position cannot be identified. Therefore, in the fourth embodiment, for example, in a case where an acceleration of a certain threshold value or higher occurs at a position separated±threshold value [m] or higher from a position to be monitored such as an expansion joint position between stations, it is possible to identify a position by the position identification information due to a method acquired by an existing system, such as a GPS position at that moment. As the position identifying method, in addition to GPS, there is a method of obtaining by integrating the vehicle speed.

In addition, it is also possible to obtain the position by integrating the speed data between the peak position identified by DP matching and the position where the corresponding acceleration is generated. In a case where the peak position identified by DP matching and the position where the corresponding acceleration is generated are close to each other, the position can be identified with higher accuracy than the speed integration from the station start position. The speed used in the calculation may be obtained from the system of the vehicle or may be calculated by integrating the acceleration (including the DC component) of the vehicle in the front-rear direction.

According to the fourth embodiment, in a case where the acceleration deteriorates not only at a characteristic position of the track such as the expansion joint but also at an unexpected position, the position can be identified.

Fifth Embodiment

Figure 15:
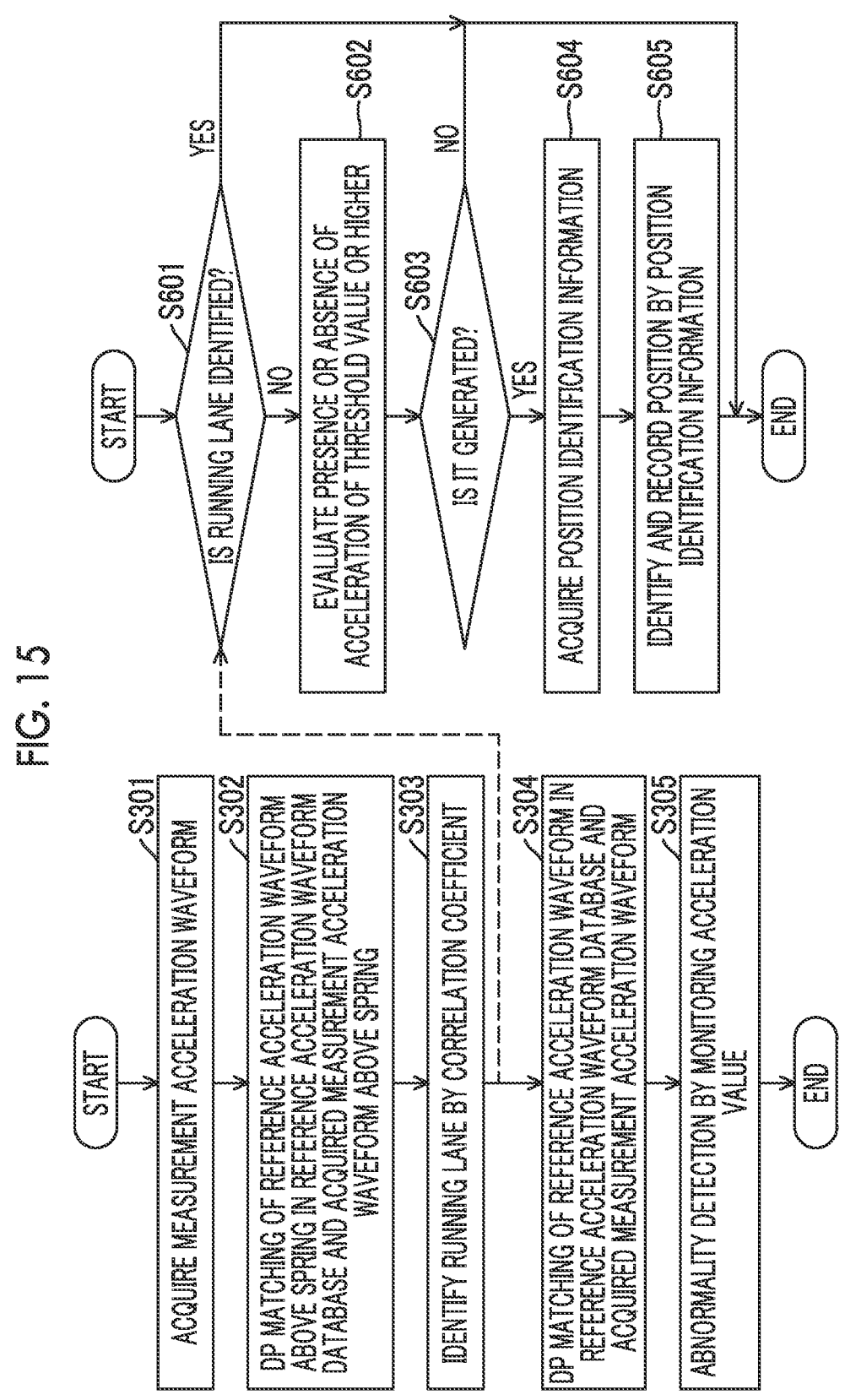
FIG. 15 is a flowchart illustrating an operation example of an acceleration monitoring device according to a fifth embodiment of the present disclosure.

An acceleration monitoring device 2b (FIG. 13) according to a fifth embodiment of the present disclosure will be described with reference to FIG. 15. FIG. 15 is a flowchart illustrating an operation example of the acceleration monitoring device 2b according to the fifth embodiment of the present disclosure. In the operation example according to the fifth embodiment illustrated in FIG. 15, the operation of the monitoring unit 24b is partially different from that in the fourth embodiment. That is, as illustrated in FIG. 15, in the fifth embodiment, the monitoring unit 24b determines whether or not the running lane is identified (step S601), and in a case where the running lane is not identified (when "NO" in step S601), evaluates the presence or absence of acceleration of the threshold value or higher (step S602). In a case where the acceleration is generated (when "YES" in step S603), the position identification unit 28 identifies the position by the position identification information (step S604), and the recording unit 29 records the position, the acceleration value, and the like in the threshold-exceeding acceleration database 267 (step S605).

In the fifth embodiment, the acquisition unit 23*b* further acquires the position identification information associated with the measurement acceleration waveform. In addition, when the acceleration value of the measurement acceleration waveform exceeds a predetermined threshold value in a case where the running lane identification unit 27 cannot identify the running lane, the recording unit 29 associates the acceleration value with the generation position based on the position identification information, and records the acceleration value and the generation position in the threshold-exceeding acceleration database 267.

In the flow of the second to fourth embodiments, in a case where the track state changes significantly when the running lane is identified by the correlation coefficient after DP matching, even if DP matching is performed, there is a possibility that the running lane cannot be identified because the reference acceleration waveform and the tendency of the database are significantly different. In addition, even when analyzing data running in a running lane or a section for which a database is not created, the running lane cannot be identified. Therefore, in the fifth embodiment, in a case where the running lane cannot be identified, position information is acquired for the position where the acceleration of the threshold value or higher set in advance is generated by the existing position identifying method, as that in the fourth embodiment.

According to the fifth embodiment, in a case where the running lane cannot be identified by DP matching, the position information of the position where the acceleration is large can be acquired by an existing position identifying method (GPS or the like).

Other Embodiments

Although the embodiments of the present disclosure have been described in detail with reference to the drawings, the specific configuration is not limited to the present embodiment and includes design changes and the like within a range not deviating from the gist of the present disclosure. For example, each configuration and operation in the first to fifth embodiments can be appropriately combined with or substituted with the configuration and operation of another embodiment. In addition, monitoring or evaluation of the measurement acceleration waveform may be performed for each section during operation, or may be performed collectively at the end of daily operation, for example.

<Configuration of Computer>

Figure 18:
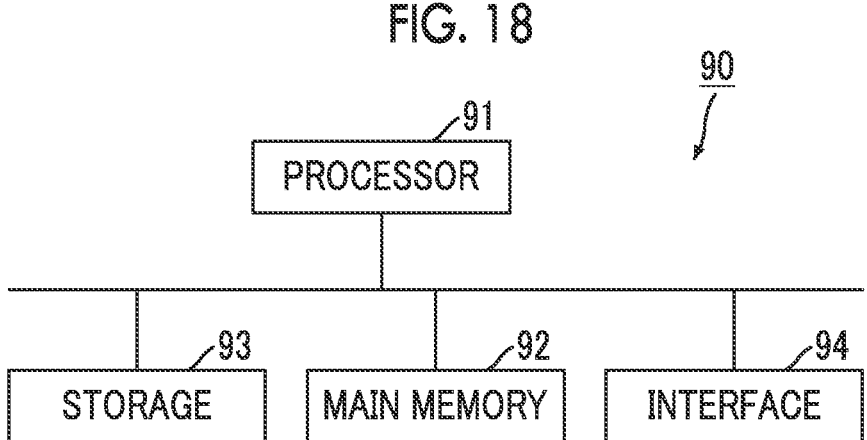
FIG. 18 is a schematic block diagram illustrating a configuration of a computer according to at least one embodiment.

FIG. 18 is a schematic block diagram illustrating a configuration of a computer according to at least one embodiment.

The computer 90 is provided with a processor 91, a main memory 92, a storage 93, and an interface 94.

The above-described acceleration monitoring devices 2, 2*a*, 2*b*, and the like are mounted on the computer 90. The operation of each of the above-described processing units is stored in the storage 93 in the form of a program. The processor 91 reads a program from the storage 93, loads the program into the main memory 92, and executes the above processing according to the program. In addition, the processor 91 secures a storage area corresponding to each of the above-described storage units in the main memory 92 according to the program.

The program may be for realizing a part of the functions exerted by the computer 90. For example, the program may exert the functions in combination with another program already stored in the storage or in combination with another program mounted on another device. In another embodiment, the computer may be provided with a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), a field programmable gate array (FPGA), and the like. In this case, a part or all of the functions realized by the processor may be realized by the integrated circuit.

Examples of the storage 93 include a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The storage 93 may be an internal medium directly connected to a bus of the computer 90 or an external medium connected to the computer 90 via the interface 94 or a communication line. In addition, in a case where this program is distributed to the computer 90 via a communication line, the computer 90 receiving the distribution may load the program in the main memory 92 and execute the above processing. In at least one embodiment, the storage 93 is a tangible storage medium that is not transient.

<Appendix>

The acceleration monitoring devices 2, 2*a*, and 2*b* described in each embodiment are obtained as follows, for example.

(1) The acceleration monitoring devices 2, 2*a*, and 2*b* according to a first aspect include an acquisition unit 23 that acquires the measurement acceleration waveform AWM1 which is the acceleration waveform measured by the vehicle 3 running on the track T1, the storage unit 26 that stores the reference acceleration waveforms AWB1 and AWB2 which are the acceleration waveform as a reference for the measurement acceleration waveform for the predetermined regions of interest RI1 and RI2 which are a partial region of the track, and the monitoring unit 24*b* that monitors the acceleration value of the non-linear expansion and contraction measurement acceleration waveforms AWM1P1*c* and AWM1P2*c* which are the acceleration waveform corresponding to the reference acceleration waveform by nonlinearly expanding and contracting the time axis of the measurement acceleration waveform. According to the present aspect and each of the following aspects, the position relating to the region of interest can be accurately identified.

(2) The acceleration monitoring devices 2, 2*a*, and 2*b* according to a second aspect are the acceleration monitoring devices 2, 2*a*, and 2*b* according to (1), in which the acceleration value is a peak value corresponding to a predetermined peak value included in the reference acceleration waveform.

(3) The acceleration monitoring devices 2*a* and 2*b* according to the third aspect are the acceleration monitoring devices 2*a* and 2*b* according to (1) or (2), in which the storage unit 26 stores a plurality of the reference acceleration waveforms for each of a plurality of running lanes on the track, the device further includes the running lane identification unit 27 that identifies the running lane by comparing each correlation coefficient between each non-linear expansion and contraction measurement acceleration waveform which is each acceleration waveform corresponding to each reference acceleration waveform for each running lane by nonlinearly expanding and contracting the time axis of the measurement acceleration waveform, and each corresponding reference acceleration waveform, and the monitoring units 24 and 24b monitor the acceleration value of the non-linear expansion and contraction measurement acceleration waveform in which the time axis of the measurement acceleration waveform is nonlinearly expanded and contracted so as to correspond to the reference acceleration waveform of the identified running lane. According to the present aspect, the running lane of the measurement acceleration waveform may not be identified in advance.

(4) The acceleration monitoring devices 2a and 2b according to a fourth aspect are the acceleration monitoring devices 2a and 2b of (3), in which the vehicle 3 includes the vehicle body 301, the bogie 303, and the shock absorbing device 304 provided between the vehicle body 301 and the bogie 303, the measurement acceleration waveform includes the first measurement acceleration waveform measured by the first acceleration sensor 32b mounted on the vehicle body 301 and the second measurement acceleration waveform measured by the second acceleration sensors 32a and 32c mounted on the bogie 303, the reference acceleration waveform includes the first reference acceleration waveform for each running lane corresponding to the first acceleration sensor and the second reference acceleration waveform for each running lane corresponding to the second acceleration sensor, and the running lane identification unit 27 identifies the running lane by comparing each correlation coefficient between each non-linear expansion and contraction measurement acceleration waveform corresponding to each first reference acceleration waveform for each running lane by nonlinearly expanding and contracting a time axis of the first measurement acceleration waveform, and each corresponding first reference acceleration waveform.

(5) The acceleration monitoring devices 2, 2a, and 2b according to a fifth aspect are the acceleration monitoring devices 2, 2a, and 2b according to (1) to (4), in which the monitoring units 24 and 24b further determine whether there is an abnormality in a first vehicle or on the track, based on a result of comparison between the acceleration value for each section of the non-linear expansion and contraction measurement acceleration waveform corresponding to the measurement acceleration waveform measured by a second vehicle and a predetermined threshold value for each section, in a case where the acceleration value for each predetermined section of the non-linear expansion and contraction measurement acceleration waveform corresponding to the measurement acceleration waveform measured by a first vehicle exceeds the threshold value for each section.

(6) The acceleration monitoring device 2b according to a sixth aspect is the acceleration monitoring device 2b according to (1) to (4), in which the acquisition unit 23 further acquires position identification information associated with the measurement acceleration waveform, and the device further includes the position identification unit 28 that identifies a generation position of an acceleration value exceeding a predetermined threshold value based on the position identification information, in a case where the acceleration value of the measurement acceleration waveform other than the measurement acceleration waveform corresponding to the reference acceleration waveform by nonlinearly expanding and contracting the time axis exceeds the threshold value.

(7) The acceleration monitoring device 2b according to a seventh aspect is the acceleration monitoring device 2b according to (6), in which the position identification information is information corresponding to a speed of the vehicle, and the position identification unit identifies the generation position based on an integrated value of the speed with reference to a position of a nearest region of interest.

(8) The acceleration monitoring device 2b according to an eighth aspect is the acceleration monitoring device 2b according to (3) or (4), in which the acquisition unit 23b further acquires position identification information associated with the measurement acceleration waveform, and the device further includes the recording unit 29 that associates and records an acceleration value and a generation position based on the position identification information, when the acceleration value of the measurement acceleration waveform exceeds a predetermined threshold value in a case where the running lane identification unit does not identify the running lane.

INDUSTRIAL APPLICABILITY

According to each aspect of the present invention, the position can be identified with high accuracy.

The invention claimed is:

1. An acceleration monitoring device comprising:
an acquisition unit that acquires a measurement acceleration waveform which is an acceleration waveform measured by a vehicle running on one of a plurality of running lanes on a track, wherein
the measurement acceleration waveform includes
a first measurement acceleration waveform measured by a first acceleration sensor mounted on a vehicle body of the vehicle, and
a second measurement acceleration waveform measured by a second acceleration sensor mounted on a bogie of the vehicle;
a storage unit that stores a reference acceleration waveform which is an acceleration waveform as a reference for the measurement acceleration waveform for a predetermined region of interest which is a partial region of the track, wherein
the reference acceleration waveform includes
a first reference acceleration waveform for each of the plurality of running lanes corresponding to the first acceleration sensor, and
a second reference acceleration waveform for each of the plurality of running lanes corresponding to the second acceleration sensor;
a monitoring unit that monitors an acceleration value of a non-linear expansion and contraction measurement acceleration waveform which is an acceleration waveform corresponding to the reference acceleration waveform by nonlinearly expanding and contracting a time axis of the measurement acceleration waveform; and
a running lane identification unit that identifies a running lane of the plurality of running lanes in which the vehicle runs by comparing a correlation coefficient between (i) a non-linear expansion and contraction measurement acceleration waveform corresponding to the first reference acceleration waveform by nonlinearly expanding and contracting a time axis of the first measurement acceleration waveform, and (ii) a corresponding first reference acceleration waveform, for each of the plurality of running lanes, wherein
the monitoring unit, upon the running lane being identified, monitors the acceleration value based on the second measurement acceleration waveform.

2. The acceleration monitoring device according to claim 1, wherein the acceleration value is a peak value corresponding to a predetermined peak value included in the reference acceleration waveform.

3. The acceleration monitoring device according to claim 1, wherein the monitoring unit monitors the acceleration value of the non-linear expansion and contraction measurement acceleration waveform in which the time axis of the measurement acceleration waveform is nonlinearly expanded and contracted so as to correspond to the reference acceleration waveform of the identified running lane.

4. The acceleration monitoring device according to claim 3, wherein the vehicle includes the vehicle body, the bogie, and a shock absorbing device provided between the vehicle body and the bogie.

5. The acceleration monitoring device according to claim 3, wherein the acquisition unit further acquires position identification information associated with the measurement acceleration waveform, and the device further comprises a recording unit that associates and records an acceleration value and a generation position based on the position identification information, when the acceleration value of the measurement acceleration waveform exceeds a predetermined threshold value in a case where the running lane identification unit does not identify the running lane.

6. The acceleration monitoring device according to claim 1, wherein the monitoring unit further determines whether there is an abnormality in a first vehicle or on the track, based on a result of comparison between the acceleration value for each section of the non-linear expansion and contraction measurement acceleration waveform corresponding to the measurement acceleration waveform measured by a second vehicle and a predetermined threshold value for each section, in a case where the acceleration value for each predetermined section of the non-linear expansion and contraction measurement acceleration waveform corresponding to the measurement acceleration waveform measured by the first vehicle exceeds the threshold value for each section.

7. The acceleration monitoring device according to claim 1, wherein the acquisition unit further acquires position identification information associated with the measurement acceleration waveform, and the device further comprises a position identification unit that identifies a generation position of an acceleration value exceeding a predetermined threshold value based on the position identification information, in a case where the acceleration value of the measurement acceleration waveform other than the measurement acceleration waveform corresponding to the reference acceleration waveform by nonlinearly expanding and contracting the time axis exceeds the threshold value.

8. The acceleration monitoring device according to claim 7, wherein the position identification information is information corresponding to a speed of the vehicle, and the position identification unit identifies the generation position based on an integrated value of the speed with reference to a position of a nearest region of interest.

9. The acceleration monitoring device according to claim 1, wherein the region of interest is a region surrounding a step, which is an expansion joint or a guide rail joint, or a turnout, the acceleration value is a peak value corresponding to a predetermined peak value included in the reference acceleration waveform, and a generation timing of the peak value corresponds to a position of the region of interest, the acquisition unit acquires an impact acceleration which is generated at the step, which is the expansion joint or the guide rail joint, or the turnout surrounded by the region of interest, and the monitoring unit identifies the acceleration waveform corresponding to the region of interest included in the measurement acceleration waveform.

10. The acceleration monitoring device according to claim 1, wherein the acceleration waveform is an acceleration in a translational direction.

11. An acceleration monitoring method comprising:

acquiring a measurement acceleration waveform which is an acceleration waveform measured by a vehicle running on one of a plurality of running lanes on a track, wherein the measurement acceleration waveform includes a first measurement acceleration waveform measured by a first acceleration sensor mounted on a vehicle body of the vehicle, and a second measurement acceleration waveform measured by a second acceleration sensor mounted on a bogie of the vehicle;

monitoring an acceleration value of a non-linear expansion and contraction measurement acceleration waveform which is an acceleration waveform corresponding to a reference acceleration waveform which is an acceleration waveform as a reference for the measurement acceleration waveform for a predetermined region of interest which is a partial region of the track by nonlinearly expanding and contracting a time axis of the measurement acceleration waveform, wherein the reference acceleration waveform includes a first reference acceleration waveform for each of the plurality of running lanes corresponding to the first acceleration sensor, and a second reference acceleration waveform for each of the plurality of running lanes corresponding to the second acceleration sensor;

identifying a running lane of the plurality of running lanes in which the vehicle runs by comparing a correlation coefficient between (i) a non-linear expansion and contraction measurement acceleration waveform corresponding to the first reference acceleration waveform by nonlinearly expanding and contracting a time axis of the first measurement acceleration waveform, and (ii) a corresponding first reference acceleration waveform, for each of the plurality of running lanes; and upon the running lane being identified, monitoring the acceleration value based on the second measurement acceleration waveform.

12. The acceleration monitoring method according to claim 11, wherein the region of interest is a region surrounding a step, which is an expansion joint or a guide rail joint, or a turnout, the acceleration value is a peak value corresponding to a predetermined peak value included in the reference acceleration waveform, and a generation timing of the peak value corresponds to a position of the region of interest, and the acceleration monitoring method further comprises:

acquiring an impact acceleration which is generated at the step, which is the expansion joint or the guide rail joint, or the turnout surrounded by the region of interest, and identifying the acceleration waveform corresponding to the region of interest included in the measurement acceleration waveform.

13. The acceleration monitoring method according to claim 11, wherein the acceleration waveform is an acceleration in a translational direction.

14. A non-transitory computer-readable recording medium storing a program that causes a computer to execute:

acquiring a measurement acceleration waveform which is an acceleration waveform measured by a vehicle running on one of a plurality of running lanes on a track, wherein the measurement acceleration waveform includes a first measurement acceleration waveform measured by a first acceleration sensor mounted on a vehicle body of the vehicle, and a second measurement acceleration waveform measured by a second acceleration sensor mounted on a bogie of the vehicle;

monitoring an acceleration value of a non-linear expansion and contraction measurement acceleration waveform which is an acceleration waveform corresponding to a reference acceleration waveform which is an acceleration waveform as a reference for the measurement acceleration waveform for a predetermined region of interest which is a partial region of the track by nonlinearly expanding and contracting a time axis of the measurement acceleration waveform, wherein the reference acceleration waveform includes a first reference acceleration waveform for each of the plurality of running lanes corresponding to the first acceleration sensor, and a second reference acceleration waveform for each of the plurality of running lanes corresponding to the second acceleration sensor;

identifying a running lane of the plurality of running lanes in which the vehicle runs by comparing a correlation coefficient between (i) a non-linear expansion and contraction measurement acceleration waveform corresponding to the first reference acceleration waveform by nonlinearly expanding and contracting a time axis of the first measurement acceleration waveform, and (ii) a corresponding first reference acceleration waveform, for each of the plurality of running lanes; and upon the running lane being identified, monitoring the acceleration value based on the second measurement acceleration waveform.

15. The non-transitory computer-readable recording medium according to claim 14, wherein the region of interest is a region surrounding a step, which is an expansion joint or a guide rail joint, or a turnout, the acceleration value is a peak value corresponding to a predetermined peak value included in the reference acceleration waveform, and a generation timing of the peak value corresponds to a position of the region of interest, and the computer further executes:

acquiring an impact acceleration which is generated at the step, which is the expansion joint or the guide rail joint, or the turnout surrounded by the region of interest, and identifying the acceleration waveform corresponding to the region of interest included in the measurement acceleration waveform.

16. The non-transitory computer-readable recording medium according to claim 14, wherein the acceleration waveform is an acceleration in a translational direction.

* * * * *